United States Patent
Stone

(10) Patent No.: US 9,268,423 B2
(45) Date of Patent: *Feb. 23, 2016

(54) DEFINITION AND USE OF NODE-BASED SHAPES, AREAS AND WINDOWS ON TOUCH SCREEN DEVICES

(71) Applicant: Norman Michael Stone, Fleet (GB)

(72) Inventor: Norman Michael Stone, Fleet (GB)

(73) Assignee: STORMLIT LIMITED, Fleet (GB)

( * ) Notice: Subject to any disclaimer, the term of this patent is extended or adjusted under 35 U.S.C. 154(b) by 220 days.

This patent is subject to a terminal disclaimer.

(21) Appl. No.: 13/862,382

(22) Filed: Apr. 13, 2013

(65) Prior Publication Data

US 2015/0338942 A1    Nov. 26, 2015

Related U.S. Application Data

(60) Provisional application No. 61/698,625, filed on Sep. 8, 2012.

(51) Int. Cl.
*G06F 3/041* (2006.01)

(52) U.S. Cl.
CPC ...................................... *G06F 3/041* (2013.01)

(58) Field of Classification Search
CPC . G06F 3/0484; G06F 3/0488; G06F 3/04886; G06F 3/04883; G06F 3/04845
See application file for complete search history.

(56) References Cited

U.S. PATENT DOCUMENTS

| | | | |
|---|---|---|---|
| 4,555,775 A | 11/1985 | Pike | |
| 5,861,886 A * | 1/1999 | Moran et al. | 715/863 |
| 7,376,907 B2 | 5/2008 | Santoro et al. | |
| 7,752,555 B2 | 7/2010 | Sutanto et al. | |
| 7,840,912 B2 | 11/2010 | Elias et al. | |
| 7,864,163 B2 | 1/2011 | Ording et al. | |
| 7,933,632 B2 | 4/2011 | Flynt et al. | |
| 8,095,879 B2 | 1/2012 | Goertz | |
| 8,214,768 B2 | 7/2012 | Boule et al. | |
| 8,219,937 B2 | 7/2012 | Coddington | |
| 2007/0008300 A1 * | 1/2007 | Yang et al. | 345/173 |
| 2008/0307512 A1 | 12/2008 | Tandon | |
| 2009/0073136 A1 * | 3/2009 | Choi | 345/173 |
| 2010/0036750 A1 | 2/2010 | Whelan | |

(Continued)

FOREIGN PATENT DOCUMENTS

CN    102662510 A    9/2012

OTHER PUBLICATIONS

Microsoft, "Surface Getting Started Guide", Version 1.0, Feb. 9 2013, http://downloads.microsoft.com, p. 35 "Use two apps side by side (snap apps)", US.

(Continued)

*Primary Examiner* — Ricardo L Osorio
(74) *Attorney, Agent, or Firm* — Lowry Blixseth LLP; Scott M. Lowry

(57) ABSTRACT

A method and system are presented which will detect combinations of user touches on a touch screen device as nodes, and will create shapes, areas and windows from these nodes. Where the device has a communications capability, the locally defined shapes, areas and windows can be shared with remote users and databases, and similarly shapes, areas and windows created by others can be viewed on a local display. The method and system are of particular benefit to drawing applications, windows definition on touch screen devices, real estate management, navigation, and exploitation of mapping resources.

38 Claims, 19 Drawing Sheets

(56) References Cited

U.S. PATENT DOCUMENTS

| | | |
|---|---|---|
| 2010/0149109 A1 | 6/2010 | Elias |
| 2010/0259493 A1 | 10/2010 | Chang et al. |
| 2011/0007029 A1 | 1/2011 | Ben-David |
| 2011/0050620 A1* | 3/2011 | Hristov .......................... 345/174 |
| 2011/0119624 A1 | 5/2011 | Coldefy et al. |
| 2011/0254797 A1 | 10/2011 | Adamson et al. |
| 2012/0235923 A1 | 9/2012 | Araki |
| 2013/0009881 A1* | 1/2013 | Paul .............................. 345/173 |
| 2013/0194173 A1* | 8/2013 | Zhu et al. ...................... 345/156 |
| 2013/0236093 A1* | 9/2013 | Gatt et al. ..................... 382/167 |

OTHER PUBLICATIONS

Apple, "iPad User Guide for iOS 6.1 Software", 2013, http://manuals.info.apple.com/en/ipad_user_guide.pdf pp. 18 and 28, US.

Google, Android "UI" Overview, 2013, US, http://developer.android.com/design/get-started/ui-overview.html->Style -> Iconography.

Alexander Maxham (Android Headlines website), US, Photo p. 1 of http://androidheadlines.com/2012/12/verizon-samsung-galaxy-note-gets-the-root-treatment.html.

* cited by examiner

DEFINITION AND USE OF NODE-BASED SHAPES, AREAS AND WINDOWS ON TOUCH SCREEN DEVICES

CROSS-REFERENCE TO RELATED APPLICATIONS

This application claims the benefit of provisional patent application Ser. No. 61/698,625, filed Sep. 8, 2012 by the present inventor.

FEDERALLY SPONSORED RESEARCH

None

BACKGROUND

Prior Art

The following is a tabulation of some prior art that presently appears relevant:

U.S. PATENTS

| Patent Number | Kind Code | Issue Date | Patentee |
|---|---|---|---|
| 7,840,912 | B2 | 2010 Nov. 23 | Elias et al. |
| 0,254,797 | A1 | 2011 Oct. 10 | Adamson et al. |
| 8,219,937 | B2 | 2012 Jul. 10 | Coddington |
| 0,259,493 | A1 | 2010 Oct. 14 | Chang et al. |
| 0,235,923 | A1 | 2012 Sep. 20 | Araki |
| 0,149,109 | A1 | 2010 Jun. 17 | Elias |
| 0,307,512 | A1 | 2008 Dec. 11 | Tandon |
| 0,036,750 | A1 | 2010 Feb. 11 | Whelan |
| 7,752,555 | B2 | 2010 Jul. 6 | Sutanto et al. |
| 7,864,163 | B2 | 2011 Jan. 4 | Ording et al. |
| 7,933,632 | B2 | 2011 Apr. 26 | Flynt et al. |
| 7,376,907 | B2 | 2008 May 20 | Santoro et al. |
| 8,214,768 | B2 | 2012 Jul. 3 | Boule et al. |
| 8,095,879 | B2 | 2012 Jan. 10 | Goertz |
| 4,555,775 | N/A | 1985 Nov. 26 | Pike |

FOREIGN PATENT DOCUMENTS

| Patent Number | | Issue Date | Patentee |
|---|---|---|---|
| CN102662510 | A | 2012 Sep. 12 | Yuchen |

NON-PATENT SOURCES

1) Microsoft, Description of Windows RT and Windows 8 Pro as described in "Surface Getting Started Guide", Version 1.0, Feb. 9, 2013. Found at: http://downloads.microsoft.com
2) Apple, "iPad User Guide For iOS 6.1 Software", 2013. Found at: http://manuals.info.apple.com/en_US/ipad_user_guide.pdf
3) Google, Android "UI" Overview, 2013. Found at: http://developer.android.com/design/get-started/ui-overview.html The numbers and types of touch screen devices is rapidly increasing, and to a large extent these devices are mobile devices, such as mobile telephones, tablet computers, electronic readers and satellite navigation systems. Larger touch screen devices are also becoming more popular including touch screen desktop computers and touch screen televisions. The user interface to some of these devices has evolved into the common use of certain gestures with fingers or thumbs in order to perform selection, panning, scrolling and zooming functions. These gestures are often collectively referred to as multi-touch, since they rely on more than one digit being in contact with a touch-sensitive surface at a time, or the same digit being used to tap the surface more than once.

Certain multi-touch gestures are now so common as to have become de-facto standards, for example pinch, zoom and pan on many applications in, for example, Apple's iOS and Google's Android. Pinch and zoom gestures specifically are cited as prior art in terms of the gestures themselves, although these gestures are re-defined for different purposes (circle and rectangle, definition and re-sizing) here. Other gestures have been proposed, for example in U.S. Pat. No. 7,840,912 to Elias et al. (2010), which outlines a method for implementing a gesture dictionary, with examples of specific gestures which can be variously interpreted to perform functions such as save or ungroup. However there is a lack of multi-touch gestures to define shape or area. U.S. Pat. No. 0,254,797 to Adamson et al. (2011) addresses the subject of multi-shape, multi-touch gestures, but this is at the level of identification of finger and non-finger touches by area patterns, and does not consider shape or area as a definition or input technique for the use of applications on a touch screen. Coddington in U.S. Pat. No. 8,219,937 defines the manipulation of graphical objects via multi-touch gestures, including use of temporarily overlapping touches, although it is the grouping and arrangement of existing objects which is affected, and not the creation of new objects. Chang et al. in U.S. Pat. No. 0,259,493 (2010) show how a notional diagonal line and implied rectangle can be envisaged from single or multi-touch gestures. However, the purpose of this is for computational assessment and categorization of the type and nature of user touches, and not for the creation of a shape, area or window on the display device, or for the editing of the size of created entities. Araki in U.S. Pat. No. 0,235,923 (2012) does define a method for highlighting a particular part of a touch screen for processing. This innovative method involves following the path of a screen pointer which traces out a shape on the screen, the area within which is selected for further processing, such as the sending of a facsimile of the information within it to a distant location over a communication path. This method however is perimeter based, not node based, and thus lacks the simplicity and flexibility of the area definition methods described here. There is one other known proposal for defining a touch screen, screen area which has some similarities to some embodiments of the current invention; Yuchen in CN102662510 (2012) proposes the interpretation by a touch screen device of two touches on the screen to represent a rectangle area. Similarly three or more touches "in a screen-capture state" would result in a rectangular area being selected, which is governed either by maximum distances between any two points, or the definition of a minimum rectangular range incorporating all the touches. However, in a similar manner to Araki, the purpose of the screen area definition is specific to screen-capture, rather than shape drawing, area definition or window definition as documented in this document. Also, although the touches help to define one specific screen area shape (a rectangle), they are not nodes in the sense of the user being able to re-select, re-position or move any corner after the screen-capture event, or of communication as a unique area which can be re-interpreted by a remote device or application.

Related to the subject of area definition for this application is that of map personalization and utility. Tandon, in U.S. Pat. No. 0,307,512 (2011) describes a property-centric real estate map with personalised points of interest. Realtor and seller can define points of interest relevant to the surroundings of the property, annotating these with defined graphical symbols, pictures and information. The points of interest are defined via a look-up from the web-based application, based on address or multiple listing service database information. There is no use of nodes or multi-touch enabled devices to define areas of interest by a realtor, buyer or seller. Whelan, in U.S. Pat. No. 0,036,750 (2010) describes a method by which internet users can customise views of real estate wanted or for sale. Of particular relevance is the means to display the geographic area of interest; locations may be defined by the user and, significantly, Whelan proposes "inputting three or more geographic points that define a perimeter of an area in which a property wanted is located". However the definition of geographic points is earlier stated as being via the user inputting points of longitude and latitude, and not via multi-touch gestures. Sutanto et al. (2010) propose various gestures relevant to maps which combine otherwise separate operations such as zoom and pan into one operation. However this is via symbols written over the map which are interpreted in certain ways; area is not used for this, although node-based area definition defined herein will be shown to be able to fulfil combined pan and zoom even more effectively.

A third area of prior art which is pertinent to this application is that of shape definition on touch screens. One proposal promotes a method to define shapes via multi-touch gestures: Elias (2010) in U.S. Pat. No. 0,149,109 defines innovative means of drawing lines, triangles, pyramids, rectangles, cubes, pentagons, hexagons, circles, spheres and arcs. There are also means described for editing the shapes once drawn, for example to stretch and re-size shapes. While these gestures are innovative, for the most part they lack an obviousness and simplicity of concept—a tap with three fingers at the same time for instance will draw a pentagon, while a double-tap with three fingers will produce a hexagon. Apart from lacking intuition, the shapes themselves, and the operations on them are not specifically node based. That is to say the created shapes are predominantly interpreted from the spacing of the touches, follow-through gestures and identification of movement on the sides of the shapes. Currently therefore there is no method available for shape definition on multi-touch enabled devices which is both intuitive to use and node-based.

A fourth highly relevant area of prior art discussion is that of graphical user interfaces for multi-touch enabled devices and specifically windowing systems. The current state of the art for touch screen device operating systems has three main options. One (which is relevant to Android, iOS, Windows RT and Windows 8 Pro in most modes, as described in their user guides) is that only one application is visible at a time, although more than one application may be active at a time, with the user switching between active applications. A second option is where visible entities representing an application are active together and show the user a summary or preview of information related to the application, such as the temperature in the user's current location for an entity representing a weather forecasting application. In iOS these active entities consist of blocks (see Ording et al. in U.S. Pat. No. 7,864,163, 2011), and in Android they consist of widgets or notification icons (see Android "UI" Overview, 2013). For Windows RT and Windows 8 Pro a tiled view is available to the user similar to that described by Flynt et al. (2011, U.S. Pat. No. 7,933,632) and Santoro et al. (2008, U.S. Pat. No. 7,376,907), whereby no one main application requiring a significant proportion of the screen is visible to the user although various tiles may be active showing summary information updated regularly. The tiles, which may be customised in position by the user within the limits of the tile format, may also be used for launching or switching to the relevant applications, in a similar manner how active icons can be used for accessing applications in iOS and Android. Boule et al. (2012, U.S. Pat. No. 8,214,768) and Goertz (2012, U.S. Pat. No. 8,095,879) propose different means for switching between applications whereby a hidden application replaces the current application, with the current application being hidden, although two applications are not displayed concurrently. The third option (relevant to Windows RT and Windows 8 Pro, as referenced in "Surface Getting Started Guide", Version 1.0, Feb. 9, 2013) is snap applications whereby two main applications can be active and visible at the same time—each taking up half of the screen area.

Until now, there has not been a method to create, edit or define the application for unlimited windows using current touch screen device operating systems. Similarly there has been no mechanism for defining flexible, user-defined window positions or sizes, nor windows which can overlap. Although equivalent mechanisms exist for workstation, desktop and laptop computers as defined over decades by the well known products of IBM, Microsoft and Apple for example, and underlying technology from the likes of AT&T Bell Laboratories (see Pike, 1985, U.S. Pat. No. 4,555,775), these are based on the user using non-touch user interfaces such as a computer mouse, or multi-touch equivalents of mouse operations, such as scroll, select and run; there has not until now been a graphical language for windowing on touch screens and other multi-touch enabled devices.

In conclusion, insofar as I am aware, no method or apparatus is available by which node-based areas, shapes or windows can be defined and edited by touch, or shared using a multi-touch enabled device. In addition, no method or apparatus is in existence or is otherwise prior art whereby the node-based areas and shapes can be directly applied to mapping or earth model applications so as to define and share real geographic boundaries and areas. Finally, no method or apparatus currently supports the definition of an application by user touch for a window being created, or a touch screen windowing environment supporting many different visible windows concurrently.

SUMMARY

Currently there is no means to be able to define and manage shapes or areas rapidly and in a user-friendly manner using multi-touch gestures on a touch screen. Similarly there is no means of creating user-defined windows on a multi-touch enabled device, or defining the application to run in those windows. I have produced a means of defining, editing and communicating shapes, areas and windows of various geometric forms through the creation and manipulation of nodes on a multi-touch enabled surface.

One application of shape drawing on a touch screen device for various embodiments is the definition or visibility of areas on a map, whereby the shape created over a map or earth model application is directly related to a real geographic area represented by the map or earth model. This is possible primarily due to the node based nature of the system, whereby for example a positional node on a touch screen or other multi-touch enabled device equates to a geographic node on the surface of (or above) the earth and vice versa. A geographic area defined or visible in this way by various embodiments will be advantageous to real estate buyers and sellers, farmers, pilots, property developers, navigators, air traffic controllers and emergency co-ordinators, for example.

In addition to various embodiments providing an easy means of defining the shape, size and position of windows on the display of a touch screen device, embodiments allowing various means of defining the application within a newly-defined window on a touch screen device have been designed. These include methods of defining a window first, and then defining the application within it, and also drawing the window using multi-touch gestures once an application has been launched. One, or a combination of these methods, means that a multi-window display with truly independent applications running and visible concurrently, can for the first time be used on touch screen devices. Especially (but not exclusively) for larger touch screen devices such as tablet computers and touch screen personal computers, it will revolutionise the user interface with the device in the same way that Microsoft Windows replaced single DOS based applications on the personal computer. However the transformation will have even more potential due to the different shapes of windows which various embodiments allow, including circular, rectangular, triangular and pentagonal windows.

Some of the gestures for area, shape and window definition and management are entirely new in one embodiment, while for others the gestures used are adapted from existing gestures, but used for an entirely new purpose.

Being node-based, for various embodiments once defined the areas, shapes and windows can be easily manipulated and edited, such as being stretched and re-sized. The node-based aspect also gives the advantage of being able to easily share area, shape and window data from a touch screen device with other devices, networks and databases.

BRIEF DESCRIPTION OF THE DRAWINGS

The aforementioned and other aspects of the invention may best be understood by reference to the following description taken in conjunction with the accompanying drawings in which.

DETAILED DESCRIPTION OF THE PREFERRED EMBODIMENTS

One area which has not yet been addressed by multi-touch gestures is that of node-based area, shape and window definition via a touch screen device. There is a considerable range of uses to which users of mobile and even large scale touch screen devices could put this. The use of two or more pointing devices in contact with a touch-sensitive area can be used to create rectangles, circles, triangles, quadrilaterals pentagons and other polygons through the recognition and manipulation of the key nodes which define them. From these areas and shapes, greater-sided polygons, can be quickly created. Any of the resultant entities can be used to define shapes or areas on the touch screen itself, geographic areas or zoom boundaries on an associated map which may be shared with other devices or applications, or windows which may run multiple independent applications which are visible to the user at the same time on a touch screen.

In the following description of specification and operation the term "finger" is used to refer to a user's finger or other touch pointing device or stylus, and "fingers" represents a plurality of these objects, including a mixture of human fingers, thumbs and artificial pointing devices. The term "node" is taken to mean a singular two dimensional point on a two dimensional surface, plane, screen, image, map or model, which can persist in logical usage and memory after being initially defined, and can have additional data linked to it. The term "node-based" is used to define an entity created from, or pertaining to, one or more nodes. The term "cardinal nodes" refers to a minimum set of nodes which will completely define the size and form of a specific shape. The term "shape" is used to describe a pure geometric form, whereas "area" is an application of a shape to a specific two dimensional space such as on a finite screen or a map which may be larger than can be seen with a finite screen space. A "window" is taken to mean a shape specifically used to interact with a specific computer system or embedded device software application, which can run independently of other software applications or background tasks. The term "window" is analogous to its use in conventional computer systems where graphical windows and windowing systems are typically driven by a mouse or other such controller. However windows in the context of the following description are those created and controlled with one or more fingers, and which can be any geometric shape, whereas conventional computer system windows are rectangular. The term "touch screen" is used to mean an integrated touch input mechanism and display surface, such as that typically present on a tablet computer.

Various combinations of the following shape, area and window operations can be used in various embodiments.

Node-Based Circle Specification and Operation

Figure 1:
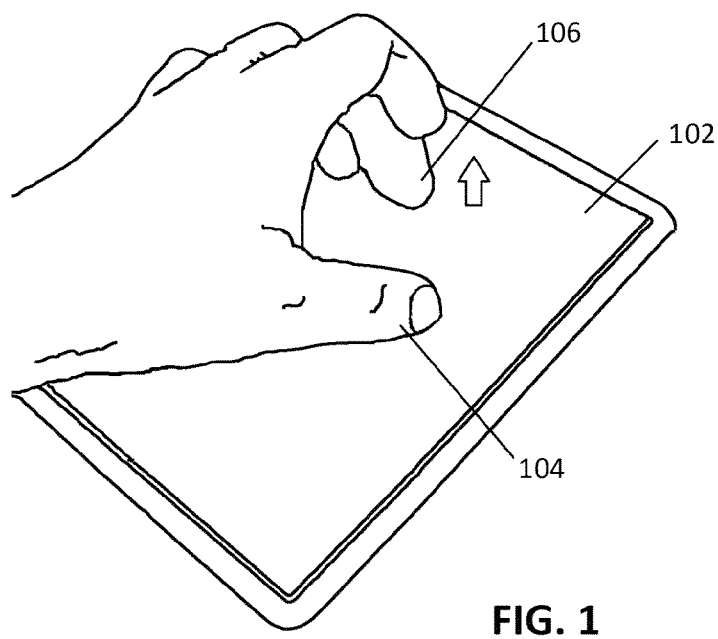
FIG. 1 represents the definition of a circle using a touch screen device according to an embodiment of the invention.

A circle is a symmetrical geometric shape with a constant radius, which can also represent a circular area and bound a circular window. Circles can be defined via multi-touch with the use of two fingers; one finger will be static at the center of the desired circle on the touch screen, while the other will move from the center outwards until the required radius is achieved. FIG. 1 illustrates the method, in which the user is using one finger 104 (in this case the left thumb) to define the center of the circle. Another finger 106 is in motion over touch screen 102 and away from the thumb. The finger which is moving away can move in any direction from the center, since it represents a point on the circumference of the circle, and therefore it can move back in towards the center to make the circle smaller. However once the circle is the required radius, finger 106 is removed. Finger 104 is also removed if no further operation is required on the circle, however it can be left to retain selection of the circle to move it or add information.

Figure 2:
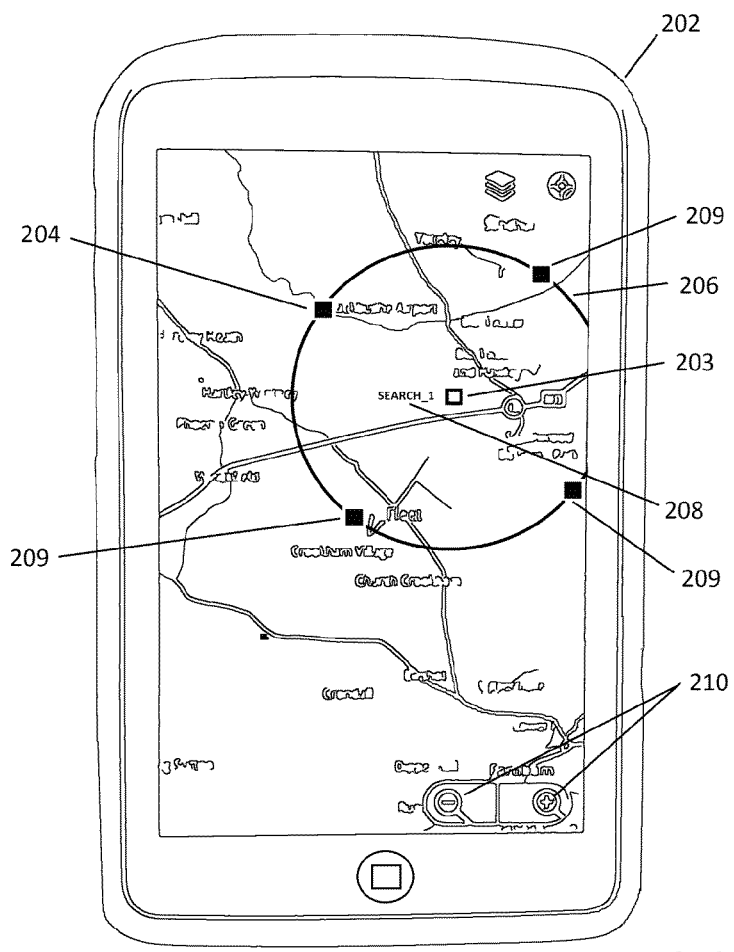
FIG. 2 is a potential result on a mapping application of a multi-touch defined circle according to embodiments of the invention.

FIG. 2 shows the result of the circle drawing operation with the circle still selected, since both the centre node 203 and the radius node 204 are visible. In this example of implementation of the circle drawing method there are additional radius nodes 209 automatically created, and the center node and the radius nodes are shaped or colored differently to be able to distinguish them from each other. In one embodiment of the circle drawing operation the radius node is invisible when the circle is no longer selected, but the circle circumference 206 is visible where it overlaps with the touch screen area of the multi-touch enabled device 202. A label 208 has been given to the circle after creation in this example. In this case some zoom in and zoom out touch screen buttons 210 are shown, since the multi-touch gesture defined for circle drawing is similar to the widely used zoom multi-touch gestures, and such buttons would allow zoom to be performed in addition to circle creation. An application which uses the circle drawing method and apparatus defined here would not be compatible in the same mode as the common pinch/zoom multi-touch gesture.

Figure 3:
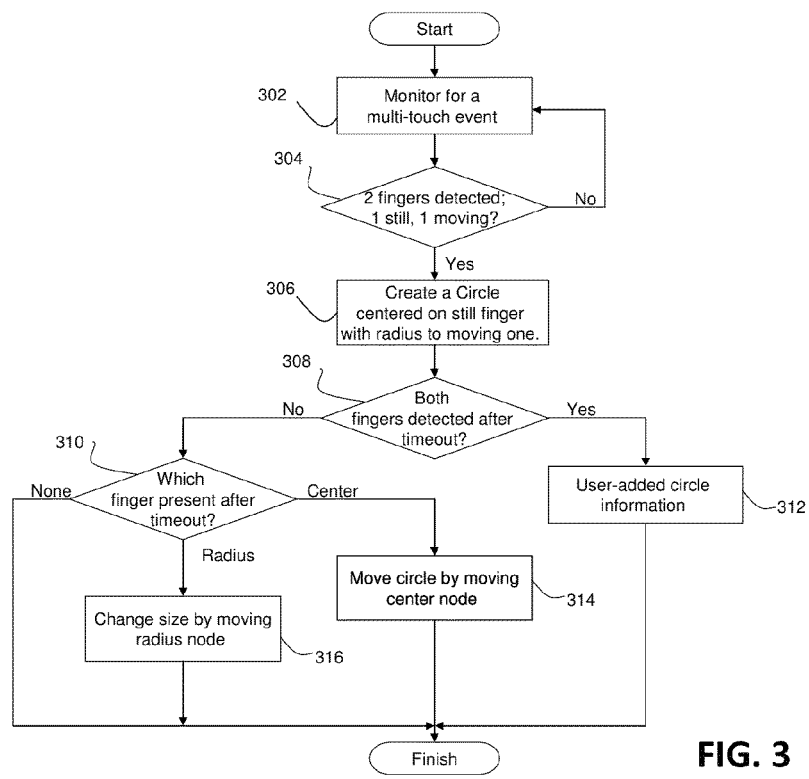
FIG. 3 shows a flow-chart of a method to define a multi-touch defined circle according to embodiments of the invention.

FIG. 3 describes how a circle drawing operation can be implemented. If multi-touch detection process 302 has determined that a multi-touch operation has been initiated and logic 304 detects that one finger is still and the other is moving away from the still finger, a dynamic circle will be drawn by process 306. The circle will be centered on the center node (created by the still finger) and have a radius determined by the distance between the center node and the radius node (created by the moving finger). The center node is defined as being the key node for the circle shape. Once both fingers are still for a set duration (for example two seconds), logic 308 will declare a timeout, and if both fingers are still present at that event, will keep the circle selected and initiate the user-added circle information process 312. This process will present a user interface applicable to the application, for example to name the circle. Logic block 308 will activate logic block 310 if only one finger is present after the timeout, and thereafter the radius can be changed until the radius node finger is removed. However, if only the center node finger is present, the circle will remain selected, and the whole circle can be moved around by following the touch path of the key node finger across the screen of the touch screen device as in process 314. Circle definition and movement will be completed upon the center node finger being removed from the touch screen, although other end events are possible in different embodiments such as a further timeout upon the centre node finger being still.

Re-selection of a circle after creation, occurs through the touching of the center node (key node) of the circle. This allows movement of the circle as previously described, and also displays one or more radius nodes on the circumference of the circle, which can also be changed while the circle is selected. In one embodiment, double-tapping of the center node will select the circle for an operation selected from a menu adjacent to the circle; such as for the addition of information, circle deletion, node position editing or conversion to an ellipse. In another embodiment, the same operations are available from a persistent touch of a center node for more than a second.

Once a circle is selected or re-selected after creation, the radius node or nodes will also be visible, and subsequent radius node selections by touch in one embodiment will allow operations on the radius node, such as movement, naming or deletion via a menu adjacent to the radius node. Deletion of a radius node will result in the deletion of the circle, although in one embodiment the center node will remain.

Deletion of the whole circle will occur in various embodiments if either the center node is deleted, or if the whole shape is selected by key node selection and the subsequent selection of circle deletion by the user.

Node-Based Ellipse Specification and Operation

Figure 4A:
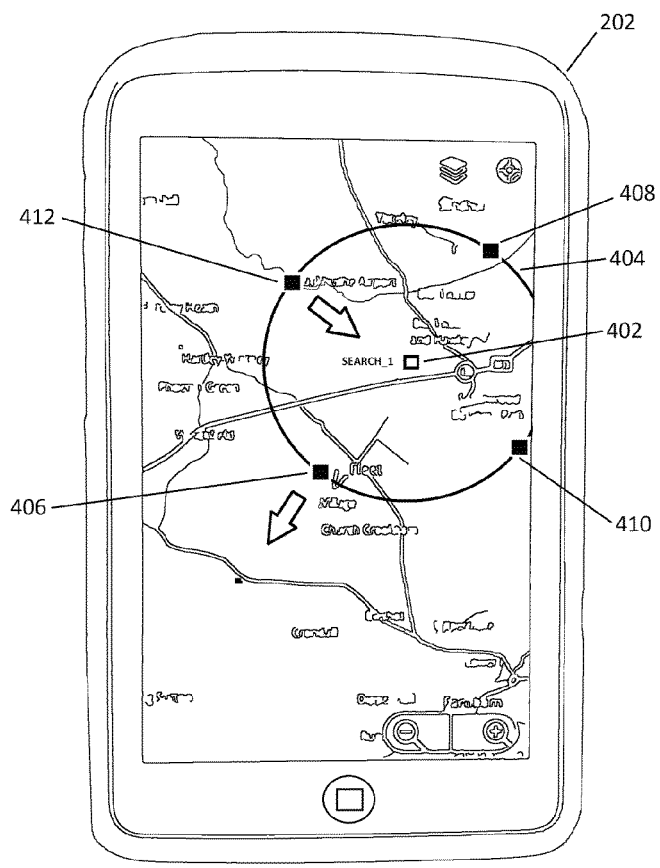
FIG. 4A demonstrates how cardinal nodes on a created circle can be used to stretch or compress the shape in different axes, permitting the creation of an ellipse according to embodiments of the invention.

An ellipse is a curved geometric shape which has a varying curve around its circumference, which can also represent an elliptical area and bound an elliptical window. Ellipses are created as a subsequent operation to the creation of a circle. FIG. 4A presents an example of a circle which has been selected prior to conversion to an ellipse. In the embodiment shown four radius nodes 406, 408, 410 and 412 are displayed to the user, evenly distributed around the circumference (404), along with the center of the circle (402). These nodes which together completely define the shape, are collectively referred to as the cardinal nodes of the shape. Every shape, including circles have a minimum set of cardinal nodes. Although circles only require two cardinal nodes to be created—the center node and one radius node —, in order to be able to create an ellipse from it, more nodes are required to be shown. In this embodiment the opposite radius nodes (410 and 412, or 406 and 408) move together but in opposite directions—either both towards the center node or both away from the center node—when one of the pair is moved, to give a symmetrical modification. The arrows shown next to nodes 412 and 406 show an example of an elongation of the shape to create an ellipse.

Figure 4B:
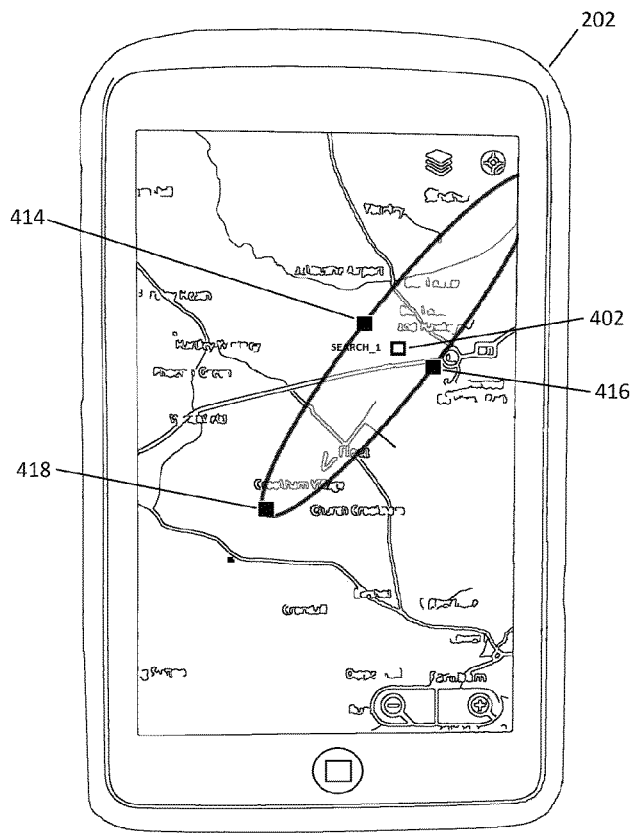
FIG. 4B illustrates the result of the creation of an ellipse from a circle according to embodiments of the invention.

FIG. 4B shows the resultant ellipse from the circle elongation indicated by the arrows in FIG. 4A. Note that this created ellipse used the embodiment of symmetrical node manipulation, since the ellipse is symmetrical, and also because node 418 has been used to elongate the ellipse to such an extent that its opposite cardinal node has moved off the touch screen. In another embodiment of circle manipulation to create an ellipse, all radius nodes are fully independent, allowing separate skewing in the different axes.

Figure 5:
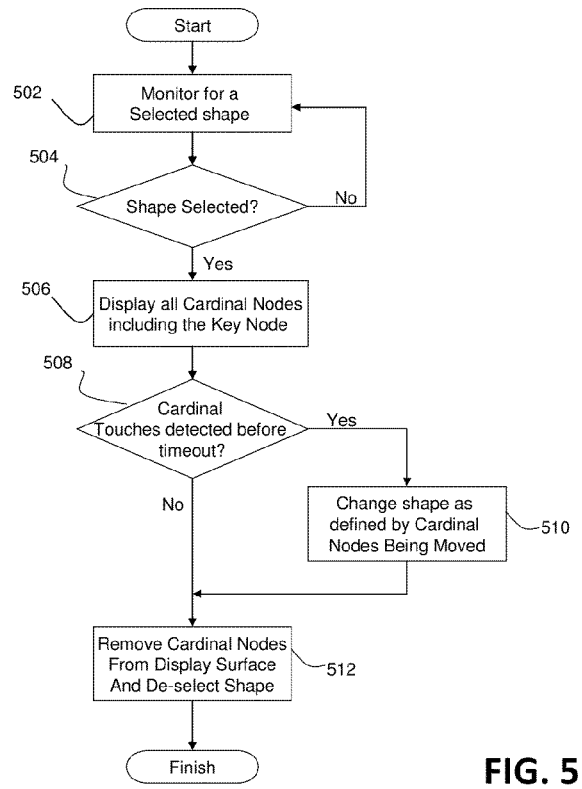
FIG. 5 shows a flow-chart of a method to create an stretched shape such as an ellipse according to embodiments of the invention.

FIG. 5 describes how an already-created shape can be modified via manipulation of its cardinal nodes. Continuous shape selection monitoring 502 occurs until there is recognition 504 that a node-based shape has been selected, for instance by the user touching or double-tapping the key node. In this case a process 506 displays all the cardinal nodes to the user where the nodes are within the touch screen display area, and allows any of the cardinal nodes to be selected and moved. Decision logic 508 detects any touches made to the cardinal nodes, which in the shown embodiment incorporates a timeout limit. The shape changing process 510 modifies shape and geometry according to the movement of cardinal nodes, such as the elongation of a circle to create an ellipse. Following completion of shape changing determined by a timeout on no nodes being moved, process 512 terminates the shape modification process, which in one embodiment results in the cardinal nodes being made invisible to the user and the shape being de-selected. In another embodiment, the shape is not de-selected until another shape is selected.

Node-Based Rectangle Specification and Operation

Figure 6:
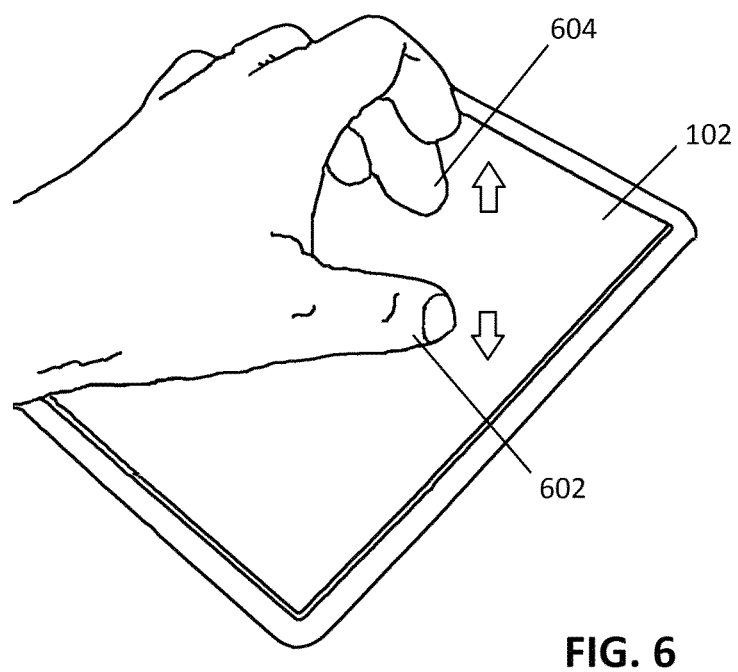
FIG. 6 represents the definition of a rectangle by the user of a touch screen device according to embodiments of the invention.

A rectangle is a four-sided geometric shape containing four right angles, which can also represent a rectangular area and bound a rectangular window. A rectangle can be defined via multi-touch with the use of two fingers, both of which will move across the touch screen—initially away from each other in one embodiment. During the rectangle definition, each finger will create, select and control the motion of a node representing a diagonally opposite corner of the rectangle. Node movement, and therefore creation is with respect to the borders of a touch screen or other multi-touch input device, and is relative to the associated axes. FIG. 6 shows how a rectangle is defined on a touch screen 102. The user is using one finger 602 (in this case the left thumb) to define the position and motion of the bottom right corner node of the rectangle and another finger 604 to define the position and motion of the top left corner node. Both fingers must be in motion over the touch screen for the touch screen device to differentiate between rectangle creation and the creation of a circle (one finger moving and one static). Two fingers from different hands may be used to define rectangle corners. Also definition of a rectangle may be made by controlling the bottom-left and top-right corner nodes, relative to the user.

Figure 7:
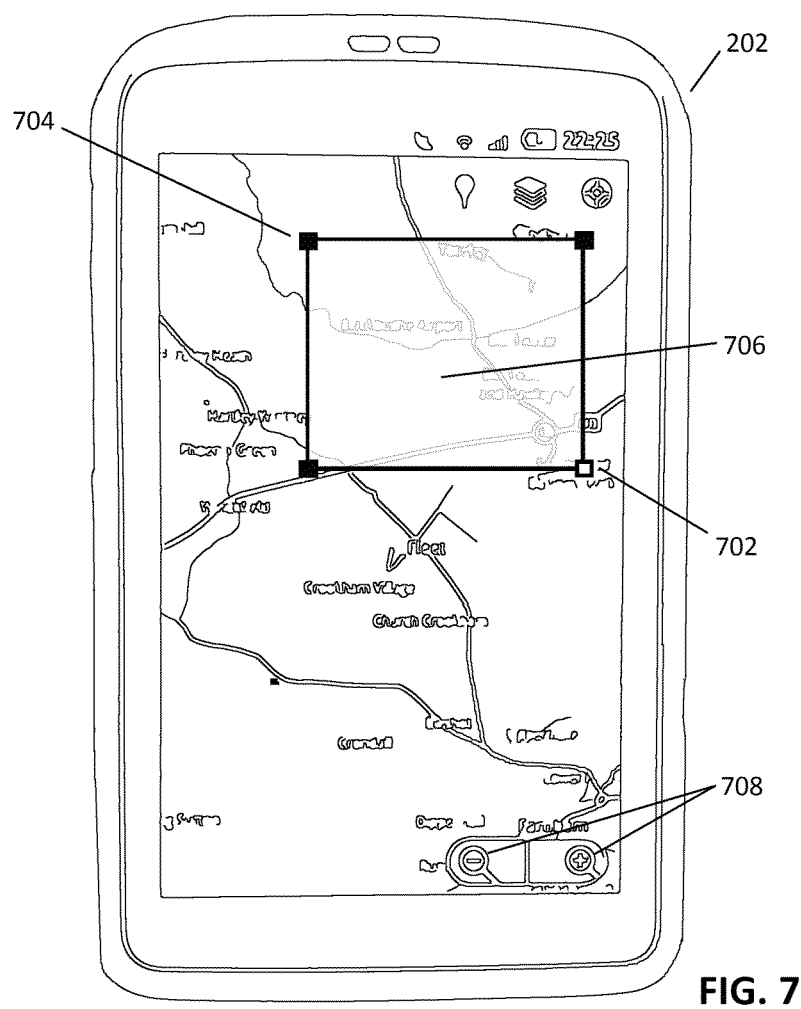
FIG. 7 is a potential use of a multi-touch defined rectangle to define an area on a touch screen device map for a combined pan and zoom operation to an area of interest according to embodiments of the invention.

FIG. 7 shows the result of the rectangle definition on touch screen device 202. A rectangle with a node at each of the four corners is displayed to the user; two of these nodes (702 and 704) are the nodes created and moved by the fingers of the user until the desired size and position of rectangle 706 was achieved. Zoom in and zoom out touch screen buttons 708 are shown, since this would be a way to zoom in and zoom out which is compatible with the embodiment described. That is to say that the rectangle creation method being described is incompatible with the widely used pinch and zoom multi-touch gesture in the same mode or application since the touch screen device logic would not be able to distinguish between whether the user wanted to zoom or define a rectangle.

The allocation of the key node of a rectangle can vary according to application and user defaults and preferences; in one embodiment the highest and furthest left on the touch screen with respect to the user becomes the key node. Note that although two nodes are used to create the rectangle, four nodes will be created—one for each corner. In one embodiment a center node will also be created at the geometrical center of the rectangle which may also be designated as the key node. In one embodiment, one or more sub-nodes will also be created along each side of the rectangle for the purpose of creating new nodes on the rectangle shape if selected by the user; for example after the creation of the rectangle, the user may decide to drag the middle of one side outwards to create a pentagon shape.

The creation of a rectangle would enable the user to create shapes on drawing applications, define areas on a mapping or geographic modelling application, and can be used to define specific screen areas or windows on a touch screen, such as for a picture-in-a-picture window or secondary application.

Figure 8:
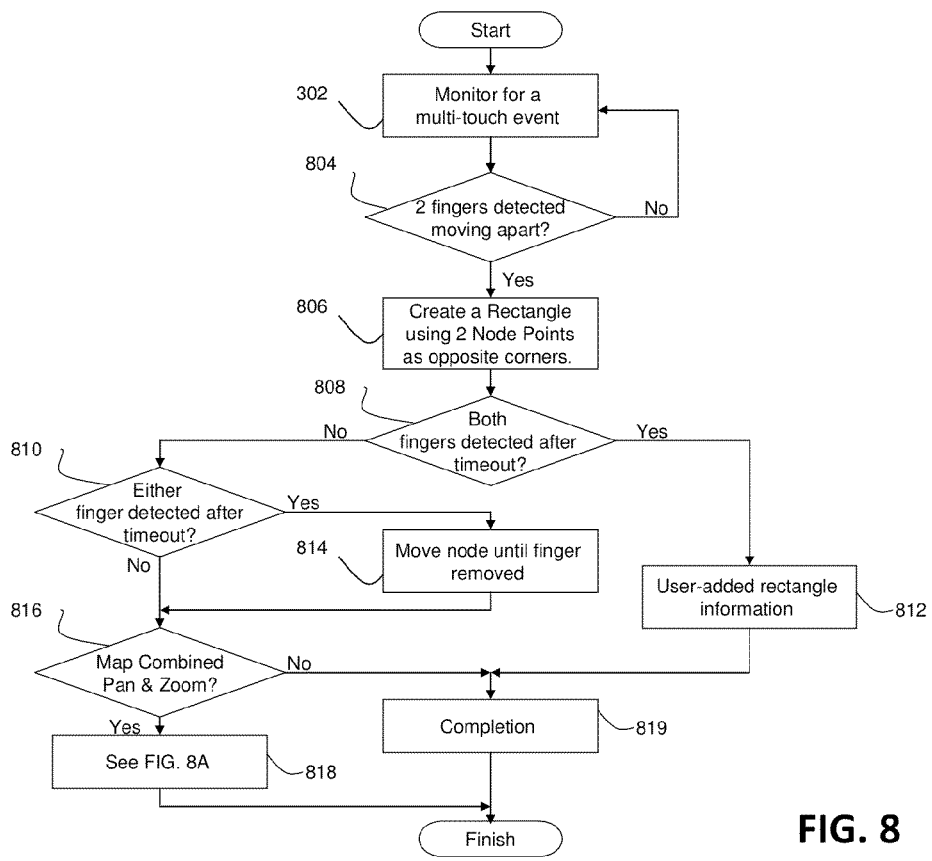
FIG. 8 shows a flow-chart of a method to detect a multi-touch defined rectangle according to embodiments of the invention.

In order to implement the creation of a rectangle, a process has been defined in FIG. 8. After monitoring for a multi-touch event (process 302) and detecting a multi-touch, where two fingers are detected which are both moving, and moving apart (decision logic 804), process 806 is initiated. This initially creates four corner nodes. The logic will interpret which node is highest according to the touch screen orientation, and designate one of the nodes covered by a finger as a top corner node; the other node under a finger will be designated a bottom corner node. The process will also determine which of the corner nodes is furthest left with respect to the current touch screen orientation, and designate it as a left node; the other node under a finger will become a right node. In this manner one node under a finger will become a top-left node or a top-right mode, while the other will become a bottom-right node or bottom-left mode, respectively. During the creation of a rectangle these two nodes will be moved by the user until they are at the final desired positions to define a rectangle, and may even swap as top/bottom or left/right nodes. The other two corner nodes (not under a finger) will move in sympathy with the other two corner nodes, for instance if the top-left and bottom-right nodes are being controlled by the user, the process will position the top-right node at the same vertical position as the top-left, and at the same horizontal position as the bottom-right node. Similarly the bottom-left node will be placed at the same vertical position as the bottom-right node and at the same horizontal position as the top-left node. The rectangle nodes will continue to track the finger positions as described until there is a timeout event determined by decision logic 808. A timeout will occur immediately if both fingers are removed from the touch screen (decision 810), and in this case the corners of the rectangle will be where the fingers were last detected and the rectangle will become complete. If one finger is still present in one embodiment, then that node may be moved until the finger is removed from the touch screen, as depicted by process 814. If both fingers remain still for a short period (such as 2 seconds) without moving, a user interface process 812 will be brought up to enable the user to add information about the shape created.

The rectangle definition completion process 819 concerns the defining nodes being put into memory, including the finger-defined nodes, the other corner nodes, a center node (where applicable) and mid-point nodes along the rectangle sides (where applicable). A key node will also be defined. At any time after creation (as for any shape) a double-tap of the key node of the shape will allow shape information to be added by the user, as well as allowing the movement of corner nodes, or the whole shape.

A different process from the standard completion process will occur where a decision block 816 recognises that the rectangle definition is on an application such as a map for which a combined pan and zoom operation is valid. In this case the area defined will define the border of a part of the existing map or view which will be magnified in a subsequent process 818 defined by FIG. 8A.

Figure 8A:
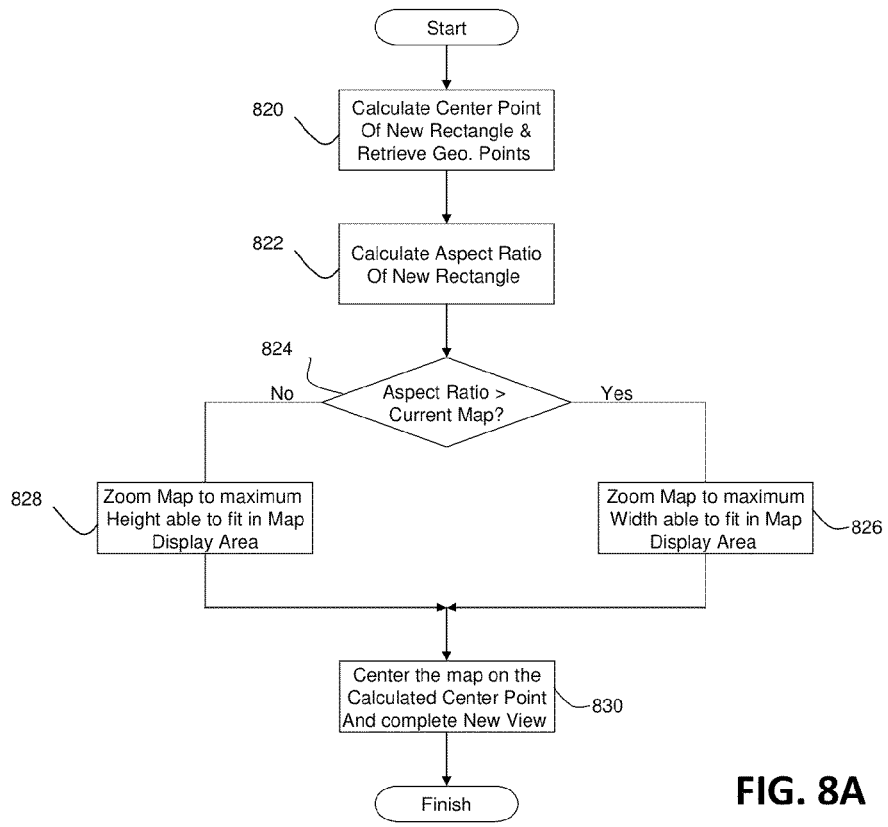
FIG. 8A shows a flow-chart of a method to provide a combined pan and zoom on a map following a multi-touch defined rectangle definition gesture.

In the combined pan and zoom implementation of rectangle creation using the above method, once a rectangle has been created on a map or other relevant view which can be expanded, such as shown in FIG. 7 the rectangle area 706 created will form the basis of a new zoomed view. If the ratio of the width to height (the aspect ratio) of the rectangle 706 is exactly the same as that of the screen, then the content of rectangle 706 will become the complete display of the touch screen, magnified or zoomed to an equivalent amount. FIG. 8A shows how the process of the automatic pan and zoom by the definition of a rectangle can be achieved. Initially there is a calculation 820 of the geometric center point of the newly created rectangle. In one embodiment where the display is a map or an earth model for which every point on the display represents a latitude/longitude coordinate, the map or earth model latitude and longitude for the corner nodes and the center node are retrieved so that the subsequent pan and zoom operations directly reference geographic points. Another step 822 calculates the aspect ratio of the newly created rectangle, and then decision block 824 compares it with that of the whole display area (window or screen). If the aspect ratio of the newly created rectangle is greater than that of the original display area then the new view calculation 826 will represent the full width of the rectangle, with extra area added at top and bottom accordingly. If however the aspect ratio of the newly created rectangle is less than or equal to that of the whole display area, task 828 will calculate a new view representing the maximum height, with additional area shown to the left and right. A completion task 830 centers the new view at the center of the display area, which effectively implements an automatic pan operation. The same task also creates the display over the whole display area according to the previously calculated area derived from the aspect ratio, and this effectively implements an automatic zoom operation.

Subsequent pan and zoom operations using rectangle definition on a touch screen may be performed to iteratively zoom in on detailed information in a display.

Node-Based Triangle Specification and Operation

Figure 9:
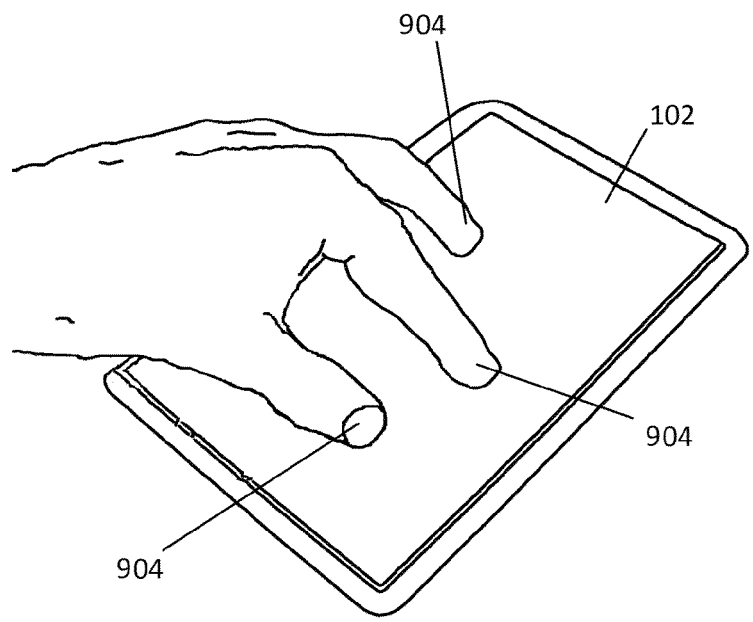
FIG. 9 represents the means of definition of a triangle by the user of a touch screen device according to embodiments of the invention.
Figure 10:
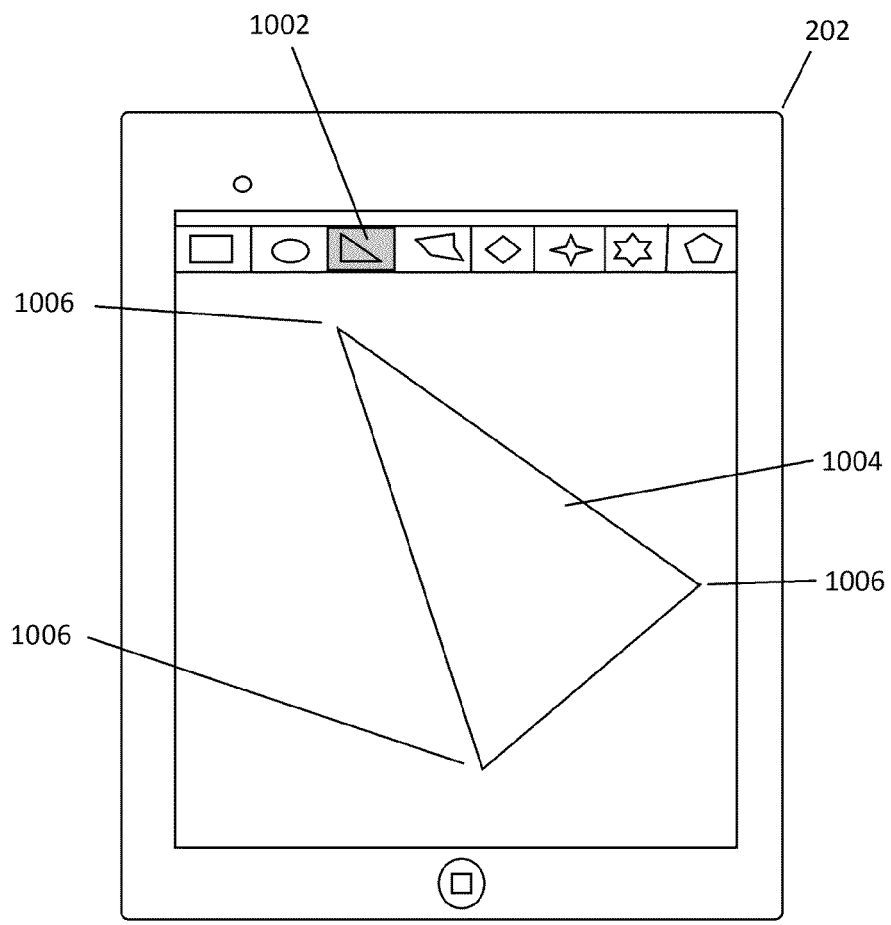
FIG. 10 is a demonstration of a multi-touch defined triangle in a drawing application according to embodiments of the invention.
Figure 11:
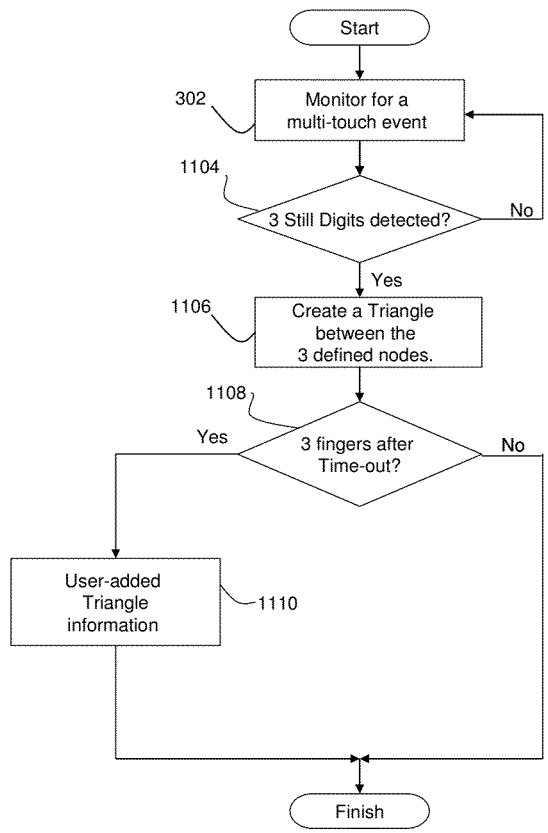
FIG. 11 shows a flow-chart of a method to detect a multi-touch defined triangle according to embodiments of the invention.

A triangle is a three-sided, closed geometric shape, which can also represent a triangular area and bound a triangular window. A triangle can be defined via multi-touch with the use of three fingers, all three of which will initially remain stationary on the touch screen. FIG. 9 shows three stationary fingers 904 held against touch screen 102. The three finger positions define nodes, which determine where the three corners are. FIG. 10 shows a triangle 1004 resulting from the touching of the multi-touch device 202 to create the nodes 1006. Whether or not the node points are normally visible, in one embodiment one of the points will be designated as the key-node. In the embodiment shown the multi-touch device is a drawing application which has a pre-defined triangle shape selected as denoted in selection area 1002, and the nodes are not visible. However in another embodiment where the application or operating system of the multi-touch device is preprogrammed to recognise three fingers—where stationary for a defined time—as the initiating event for creating a triangle, a pre-selection of shape type is not required. The process of FIG. 11 shows the mechanism required to create multi-touch, node-based triangles, including selection. Process 302 determines whether a multi-touch event has occurred, and the logic of 1104 determines whether a triangle is being defined. This is established by determining whether three fingers are touching the touch screen at the same time. If it is determined that this is the case and a minimum duration passes without the fingers moving (for example one second), a triangle node will be created at the screen position below each finger, and the subsequent task 1106 will join the nodes to create a triangle shape. In one embodiment decision logic 1108 will determine whether the three fingers are still present after an additional timeout which I contemplate to be approximately one second. If the fingers are still present, the user will be requested to add additional information for the triangle, such as a name or color, prior to completion of the triangle shape.

In one embodiment, upon creation or subsequent re-selection of the triangle, one or more additional sub-nodes will be created along the length of each side of the triangle and made visible, so that the user can change the triangle into a greater-sided polygon by dragging one or more sub-nodes off a side line to divide it.

In one embodiment re-selection of the triangle is achieved by the user double-tapping the triangle's key node. In another embodiment, the touching of any side or node of the triangle will select the whole shape.

In various embodiments, once re-selected, the triangle can be moved, with the whole shape following the user finger. Re-selection also allows the addition or editing of information desired, such as name or color.

In various embodiments, a single node of a previously created triangle is selected by touching an apex of the triangle, and the node is highlighted and visible to the user.

In one embodiment, once a single node of the triangle is selected, the node is moved by following the user's finger touch on the touch screen. This operation alters the shape of the triangle accordingly.

In one embodiment, once a single node of the triangle is selected, a user interface is presented to the user allowing additional information to be attributed to that node, including the labelling of the node and the setting of visibility of the node.

In one embodiment, once a single node of the triangle is selected, a user interface is presented to the user allowing the deletion of the selected node and the subsequent modification of the triangle into a straight line between the remaining two defining nodes.

Node-Based Quadrilateral Specification and Operation

Figure 12:
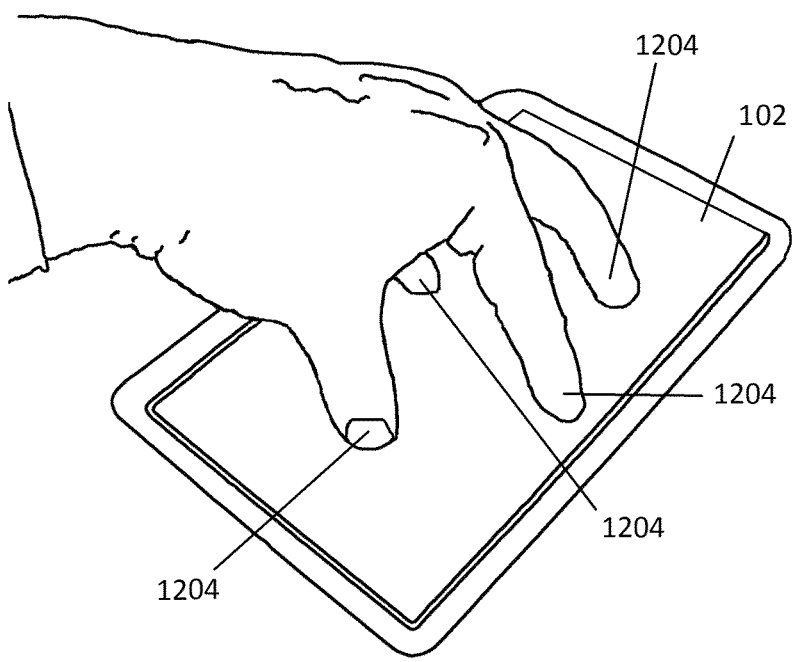
FIG. 12 represents the means of definition of a quadrilateral shape on a touch screen device according to embodiments of the invention.
Figure 13:
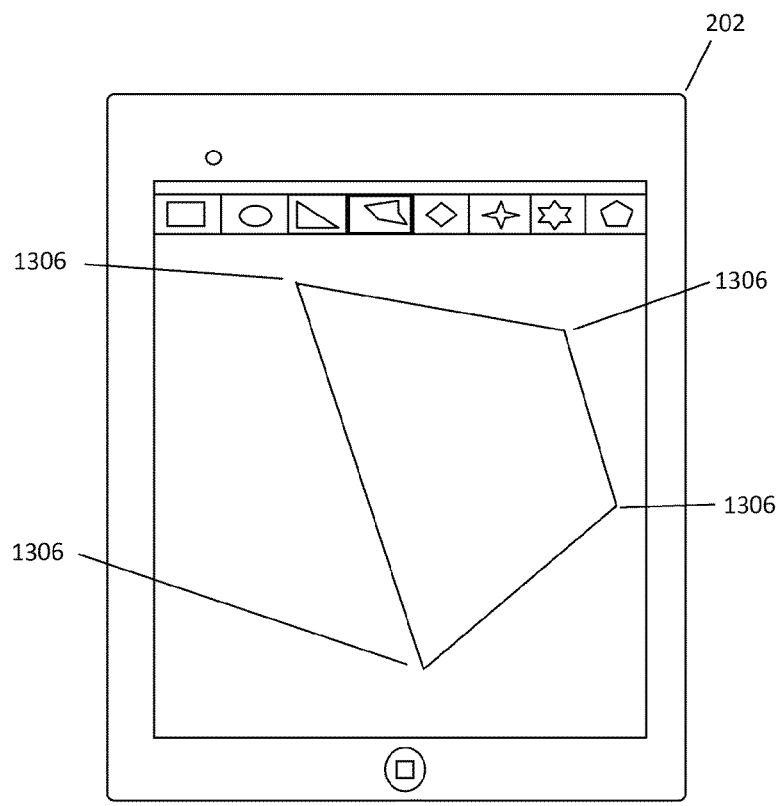
FIG. 13 is an illustration of a multi-touch defined quadrilateral shape in a drawing application according to embodiments of the invention.
Figure 14:
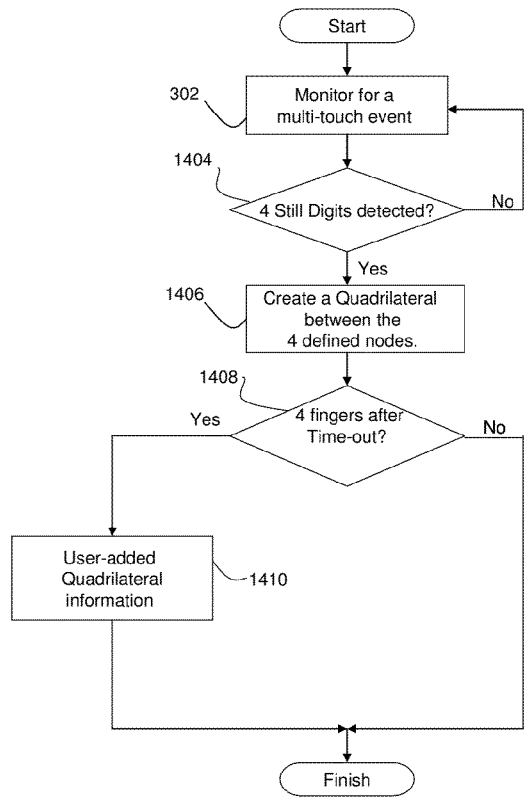
FIG. 14 shows a flow-chart of a method to detect a multi-touch defined quadrilateral shape according to embodiments of the invention.

A quadrilateral is a four-sided geometric shape which does not have to contain right angles, which can also represent a quadrilateral area and bound a quadrilateral window. A quadrilateral shape is defined in a similar manner to the triangle, but via the use of four fingers remaining stationary on the touch screen at the same time for a period I contemplate to be approximately one second. Unlike for the definition of a rectangle, a quadrilateral does not take screen borders or orientation into account. FIG. 12 shows four stationary fingers 1204 held against touch screen 102. The four finger positions define nodes, which determine where the four corners are. FIG. 13 shows a quadrilateral resulting from the touching of the multi-touch device 202 to create the nodes 1306. In one embodiment, whether or not the node points are normally visible, one of the points will be designated as the key-node. In the embodiment shown in FIG. 13 the multi-touch device is a drawing application which has a pre-defined quadrilateral shape selected where the nodes are not visible. However in another embodiment where the application or operating system of the multi-touch device is pre-programmed to recognise four fingers—where stationary for a defined time—as the initiating event for creating a quadrilateral, a pre-selection of shape type is not required. The process of FIG. 14 shows the mechanism required to create multi-touch, node-based quadrilaterals, including selection. Process 302 determines whether a multi-touch event has occurred, and the logic of 1404 determines whether a quadrilateral is being defined. This is established by determining whether four fingers are touching the touch screen at the same time. If it is determined that this is the case and a minimum duration passes without the fingers moving (for example one second), a quadrilateral node will be created at the screen position below each finger, and the subsequent task 1406 will join the nodes to create a quadrilateral shape. In one embodiment decision logic 1408 will determine whether the four fingers are still present after an additional timeout which I contemplate to be approximately one second. If the fingers are still present, the user will be requested to add additional information for the quadrilateral, such as a name or color, prior to completion of the quadrilateral shape.

In one embodiment, upon creation or subsequent re-selection of the quadrilateral, one or more additional sub-nodes will be created along the length of each side of the shape and made visible, so that the user can change the quadrilateral into a greater-sided polygon by dragging one or more sub-nodes off the existing side line to divide it.

In one embodiment re-selection of the quadrilateral is achieved by the user double-tapping the quadrilateral's key node. In another embodiment, the touching of any side or node of the quadrilateral will select the whole shape.

In various embodiments, once re-selected, the quadrilateral can be moved, with the whole shape following the user finger. Re-selection also allows the addition or editing of information desired, such as shape name or shape color.

In various embodiments, a single node of a previously created quadrilateral is selected by touching a corner of the quadrilateral, and the node is highlighted and visible to the user.

In one embodiment, once a single node of the quadrilateral is selected, the node is moved by following the user's finger touch on the touch screen. This operation alters the shape of the quadrilateral accordingly.

In one embodiment, once a single node of the quadrilateral is selected, a user interface is presented to the user allowing additional information to be attributed to that node, including the labelling of the node and the setting of visibility of the node.

In one embodiment, once a single node of the quadrilateral is selected, a user interface is presented to the user allowing the deletion of the selected node and the subsequent modification of the quadrilateral into a triangle drawn between the remaining three defining nodes.

Node-Based Pentagon Specification and Operation

Figure 15:
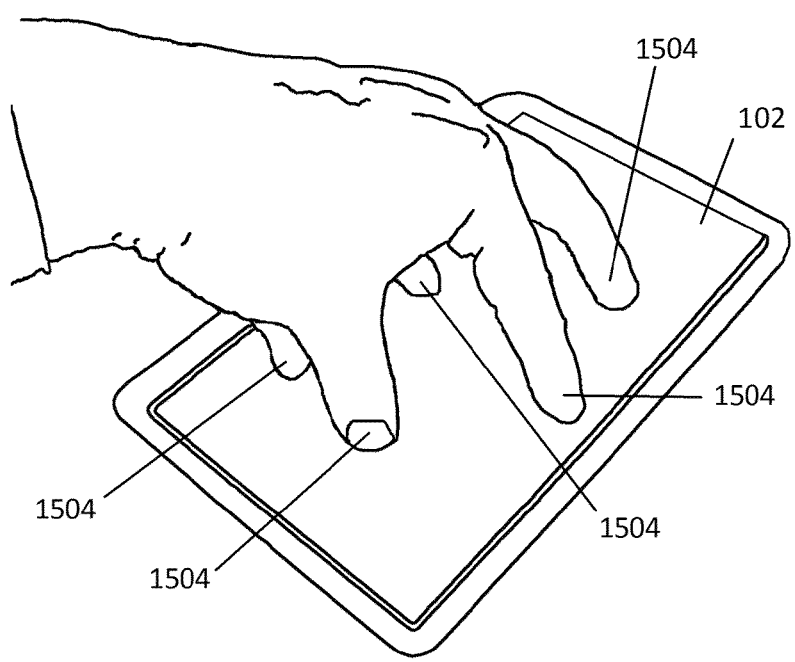
FIG. 15 represents the definition of a pentagon using a touch screen device according to embodiments of the invention.
Figure 16:
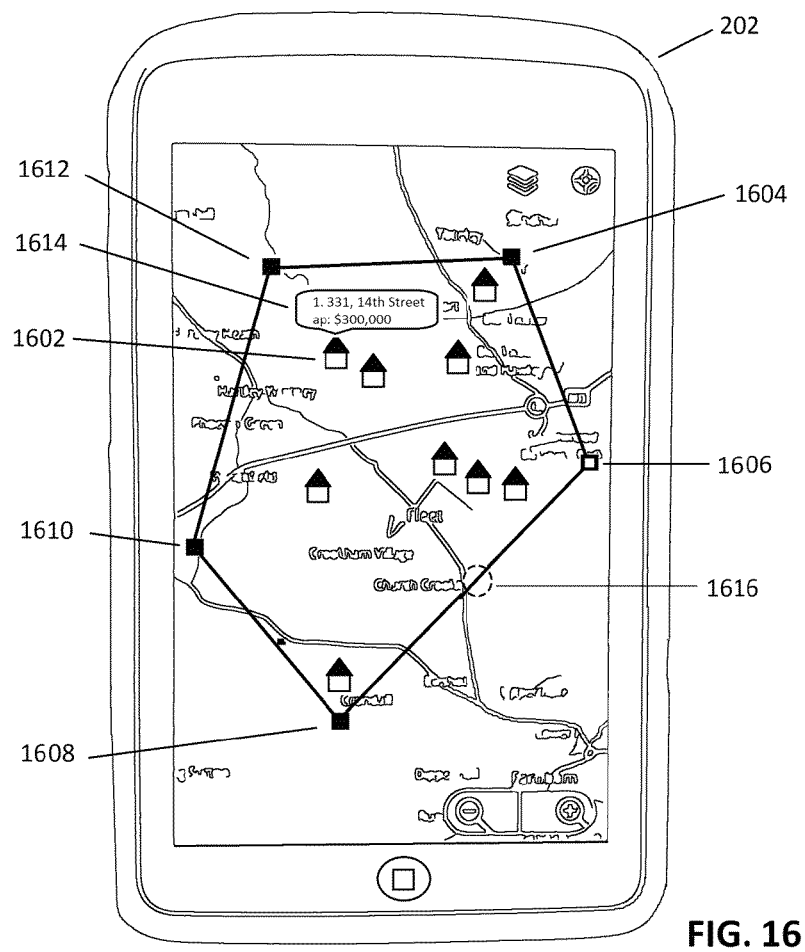
FIG. 16 illustrates a potential result on a real estate application of a multi-touch defined pentagon according to embodiments of the invention.
Figure 19:
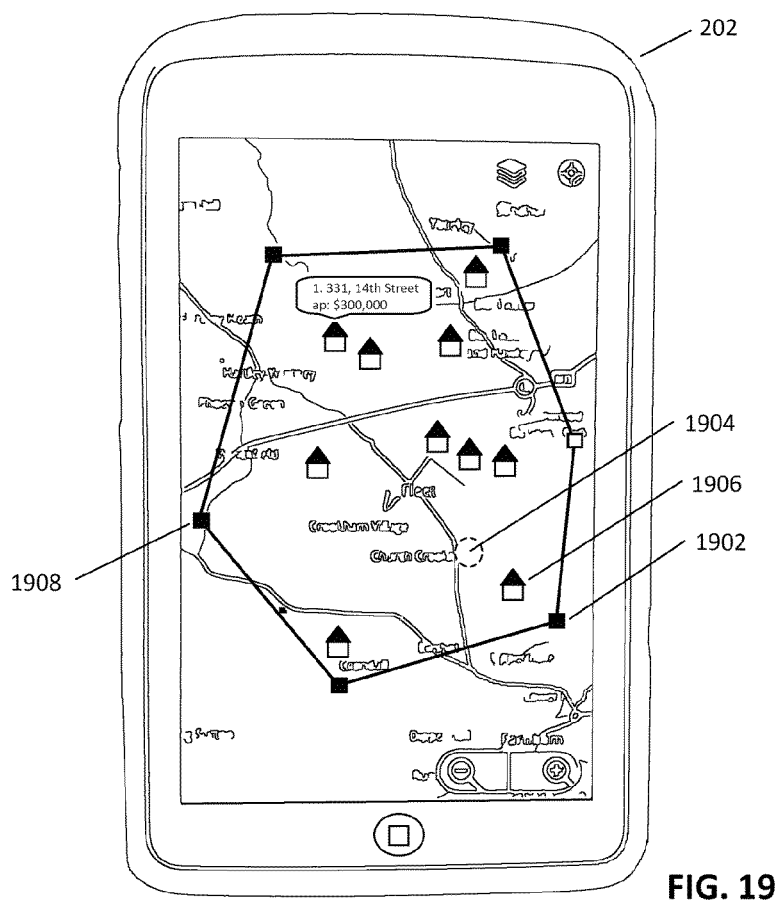
FIG. 19 demonstrates a hexagon created from a pentagon according to embodiments of the invention.

A pentagon is a five-sided, closed geometric shape, which can also represent a pentagonal area and bound a pentagonal window. A pentagon can be defined via multi-touch with the use of five fingers, all five of which will initially remain stationary on the touch screen. FIG. 15 shows five stationary fingers 1504 held against touch screen 102. The five finger positions define nodes, which determine where the five corners are. FIG. 16 shows a pentagon resulting from the touching of the multi-touch device 202 with corners of the pentagon defined by nodes 1604, 1606, 1608, 1610 and 1612. In one embodiment, whether or not the node points are normally visible, one of the points will be designated as the key-node, which in the embodiment shown in FIG. 16 is marked as a non-filled square 1606. In the embodiment illustrated in FIG. 16 the multi-touch device shows a real estate application with a map. The shape created by the user—which in this case is a pentagon—represents the geographic area of interest for a search of properties meeting criteria already defined. Property 1602 is an example of nine properties for sale which match the user's criteria, and in this case it has a banner 1614 summarizing the address and market price. Note the hidden sub-node 1616 which is an example of sub-nodes created in various embodiments of pentagon definition. If sub-node 1616 is selected by the user by (in this embodiment) touching the center of the line between node 1606 and node 1608, that sub-node will become visible (if not already visible) and can be dragged from its initial location, which will create a new node, and create a hexagon from the pentagon, as shown in FIG. 19. It can be seen that node 1902 has become a node to replace the previous sub-node 1616. The effect of this on the real estate application is to enlarge and detail the geographic area of search, and it can be seen that one new property 1906 has appeared as relevant to the search.

Figure 17:
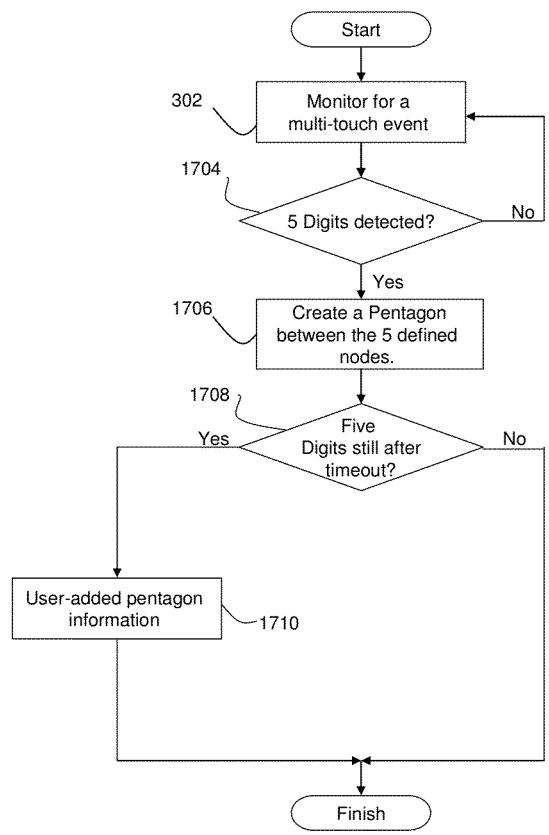
FIG. 17 shows a flow-chart of a method to detect a multi-touch defined pentagon according to embodiments of the invention.

The process of FIG. 17 shows the mechanism required to create multi-touch, node-based pentagons, including selection. Process 302 determines whether a multi-touch event has occurred, and the logic of 1704 determines whether a pentagon is being defined. This is established by determining whether five fingers are touching the touch screen at the same time. If it is determined that this is the case and a minimum duration passes without the fingers moving (for example one second), a pentagon node will be created at the screen position below each finger, and these nodes will be joined to create a pentagon shape, as shown by task 1706.

The end of a further time-out (such as one second) and decision logic 1708 will determine whether the shape is completed immediately (five fingers no longer in contact with the touch screen), or whether additional information is requested 1710 when all five fingers are detected after the time-out. In one embodiment, additional information includes options to provide a name to the pentagon and to define the color of the pentagon.

In one embodiment, upon creation or subsequent re-selection of the pentagon, one or more additional sub-nodes will be created along the length of each side of the shape and made visible, so that the user can change the pentagon into a greater-sided polygon by dragging one or more sub-nodes off the existing side line to divide it.

In one embodiment re-selection of the pentagon is achieved by the user double-tapping the pentagon's key node. In another embodiment, the touching of any side or node of the pentagon will select the whole shape.

In various embodiments, once re-selected, the pentagon can be moved, with the whole shape following the user finger. Re-selection also allows the addition or editing of information desired, such as shape name or shape color.

In various embodiments, a single node of a previously created pentagon is selected by touching a corner of the pentagon, and the node is highlighted and visible to the user.

In one embodiment, once a single node of the pentagon is selected, the node is moved by following the user's finger touch on the touch screen. This operation alters the shape of the pentagon accordingly.

In one embodiment, once a single node of the pentagon is selected, a user interface is presented to the user allowing additional information to be attributed to that node, including the labelling of the node and the setting of visibility of the node.

In one embodiment, once a single node of the pentagon is selected, a user interface is presented to the user allowing the deletion of the selected node and the subsequent modification of the pentagon into a quadrilateral drawn between the remaining four defining nodes.

Node-Based Hexagons & Polygons, Specification and Operation

Figure 18:
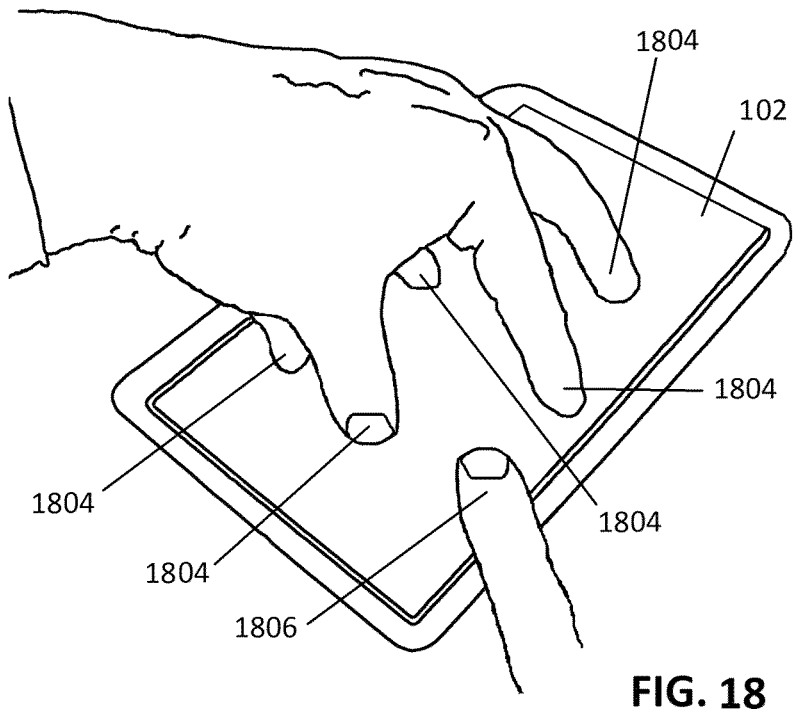
FIG. 18 represents the definition of a polygon of more than five sides and five nodes, using a touch screen device according to embodiments of the invention.

A hexagon is a closed six-sided geometric shape, which can also represent a hexagonal area and bound a hexagonal window. Generally a polygon is a closed multi-sided geometric shape, which can also represent a polygonal area and bound a polygonal window. A hexagon can be defined via multi-touch with the use of six fingers, and more generally a polygon with greater than six sides can be defined with the equivalent number of fingers remaining stationary on the touch screen for a period of approximately one or two seconds. FIG. 18 shows five stationary fingers 1804 from one hand held against touch screen 102, and another finger from another hand doing the same. The six or more finger positions define nodes, which determine where the six or more corners are. FIG. 19 shows a resulting polygon produced on multi-touch device 202.

Figure 20:
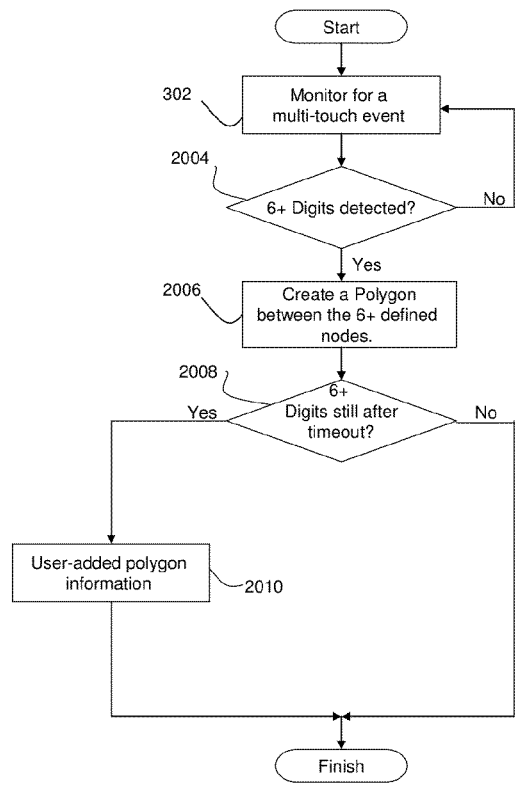
FIG. 20 shows a flow-chart of a method to detect a multi-touch defined polygon of six or more sides and nodes according to an embodiments of the invention.

The process of FIG. 20 shows the mechanism required to create multi-touch, node-based polygons, including selection. Process 302 determines whether a multi-touch event has occurred, and the logic of 2004 determines whether a polygon is being defined. This is established by determining whether six or more fingers are touching the touch screen at the same time. If it is determined that this is the case and a minimum duration passes without the fingers moving (for example one second), a polygon node will be created at the screen position below each finger, and these nodes will be joined to create a polygon shape with an equivalent number of sides, represented by task 2006.

The end of a further time-out (such as one second) and decision logic 2008 will determine whether the shape is completed immediately (fingers no longer in contact with the touch screen), or whether additional information is requested 2010 when all fingers are still detected after the time-out. In one embodiment, additional information includes options to provide a name to the polygon and to define the color of the polygon.

In one embodiment, upon creation or subsequent re-selection of the polygon, one or more additional sub-nodes will be created along the length of each side of the shape and made visible, so that the user can change the polygon into a greater-sided polygon by dragging one or more sub-nodes off the existing side line to divide it.

In one embodiment re-selection of the polygon is achieved by the user double-tapping the polygon's key node. In another embodiment, the touching of any side or node of the polygon will select the whole shape.

In various embodiments, once re-selected, the polygon can be moved, with the whole shape following the user finger. Re-selection also allows the addition or editing of information desired, such as shape name or shape color.

In various embodiments, a single node of a previously created polygon is selected by touching a corner of the polygon, and the node is highlighted and visible to the user.

In one embodiment, once a single node of the polygon is selected, the node is moved by following the user's finger touch on the touch screen. This operation alters the shape of the polygon accordingly.

Figure 21:
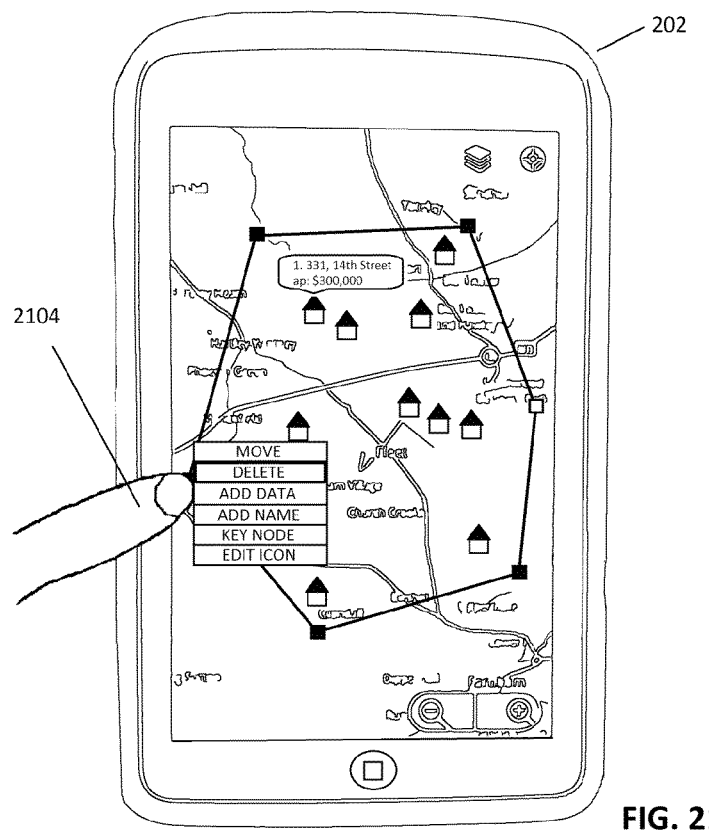
FIG. 21 illustrates how a node of a multi-touch defined shape, area or window may have operations performed on it by a user according to an embodiment of the invention.

In one embodiment, once a single node of the polygon is selected, a user interface is presented to the user allowing additional information to be attributed to that node, including the labelling of the node and the editing of the icon for that node. This embodiment is illustrated in FIG. 21, where finger 2104 has selected a node, and a drop-down menu has appeared, allowing various options on the selected node.

Figure 22:
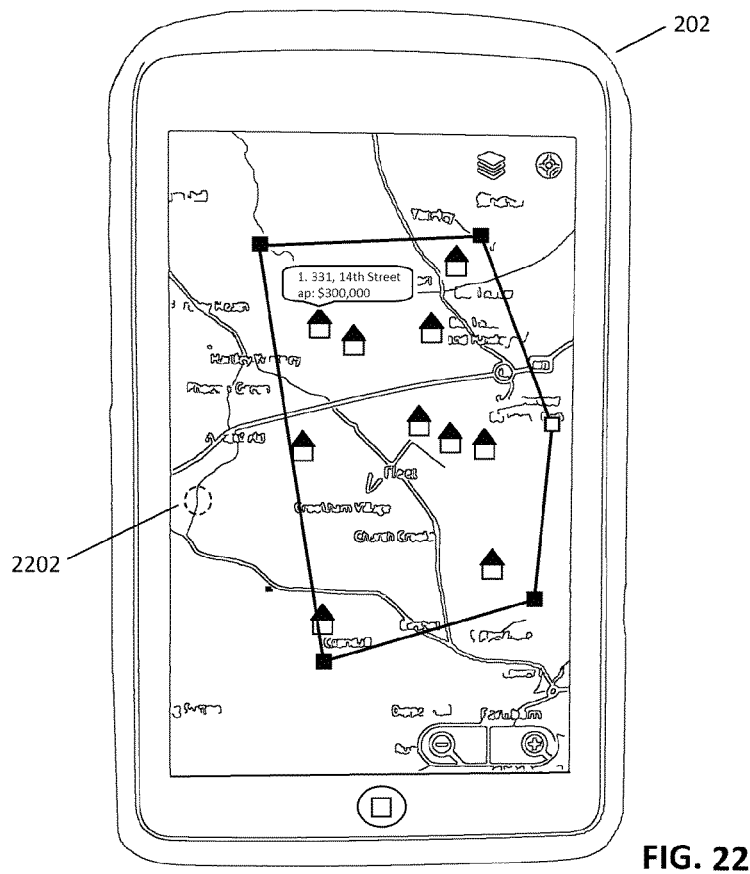
FIG. 22 demonstrates how a node of a multi-touch defined shape, area or window may be deleted, thus rendering the shape, area or window with less sides and nodes.

In one embodiment, once a single node of the polygon is selected, a user interface is presented to the user allowing the deletion of the selected node and the subsequent modification of the polygon into a polygon of one less number of sides, drawn between the remaining defining nodes. This embodiment is illustrated in FIG. 22, whereby the left-most node 2202 which was present in FIG. 21 has been deleted, resulting in a polygon of one less side.

Figure 23A:
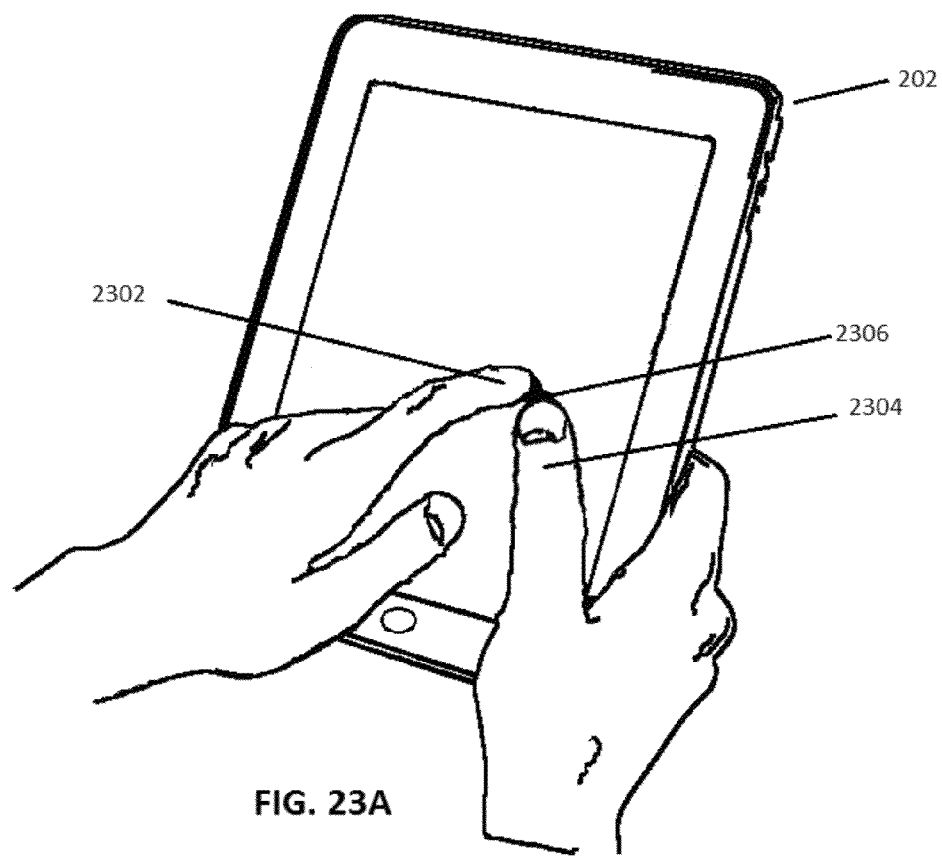
FIG. 23A illustrates the nodes detection step in creating a rectangular shape or area which will ultimately result in a new window-first window according to an embodiment of the invention.
Figure 23B:
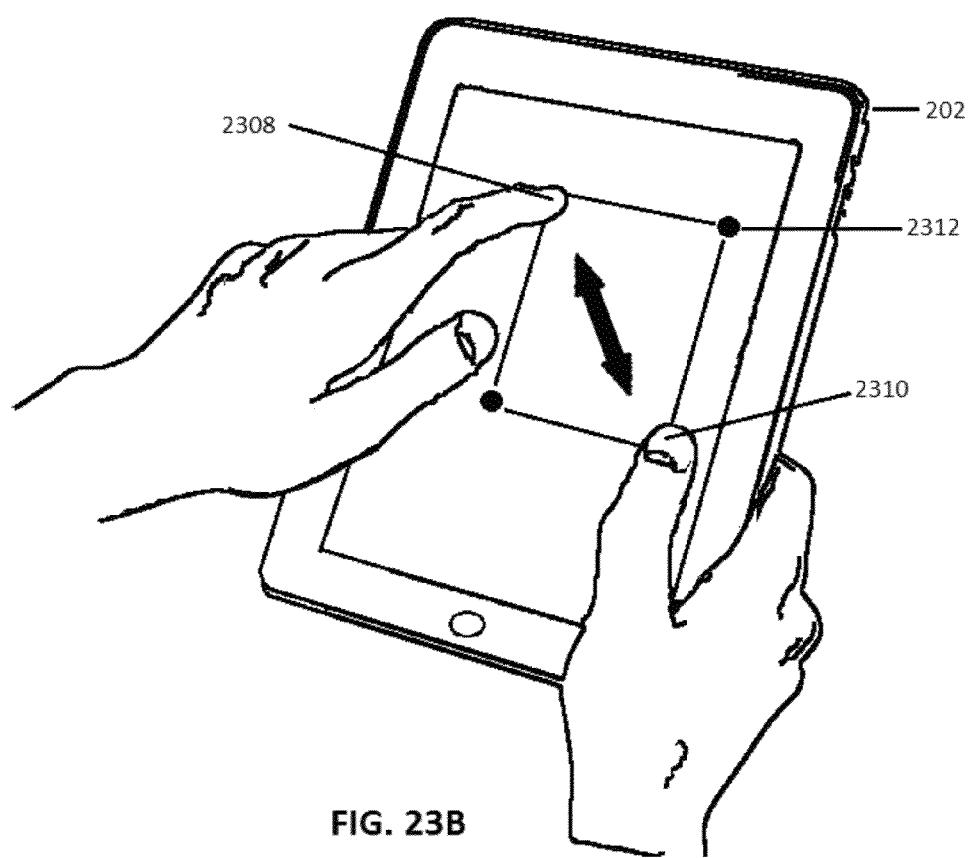
FIG. 23B illustrates the shape sizing and positioning step in creating a rectangular shape or area which will ultimately result in a new window-first window according to an embodiment of the invention.
Figure 23C:
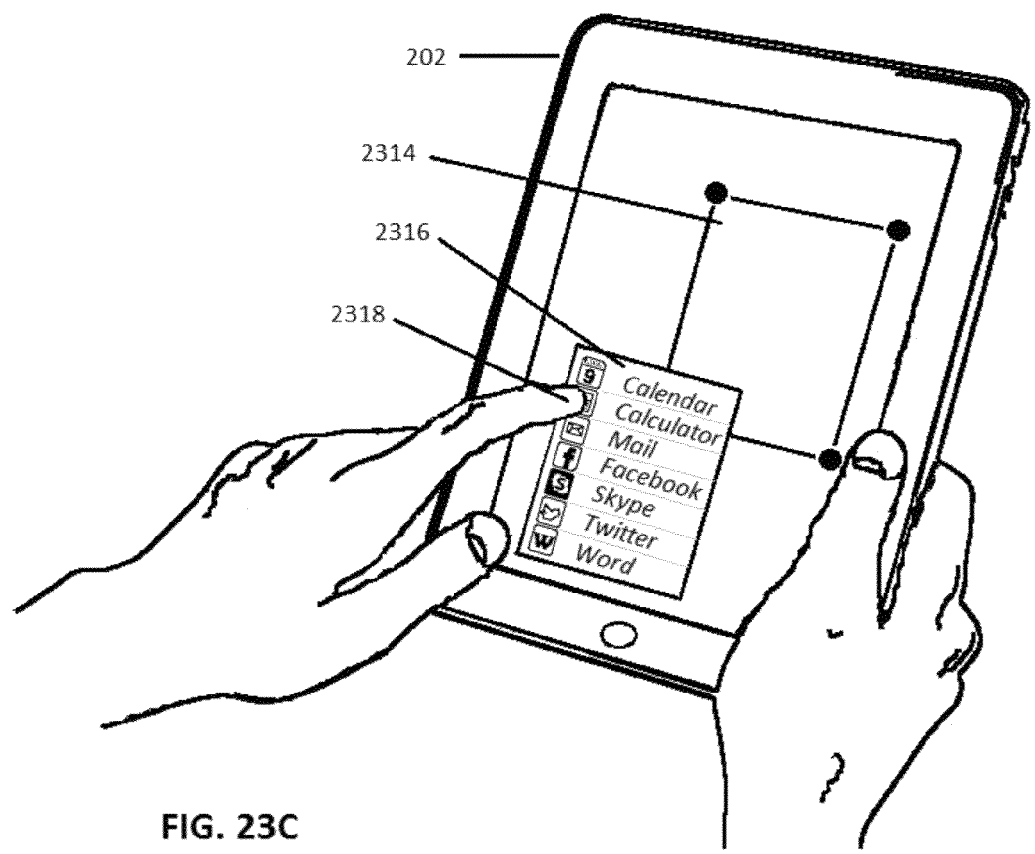
FIG. 23C illustrates the selection of application step for a newly created window-first rectangular window according to an embodiment of the invention.
Figure 23D:
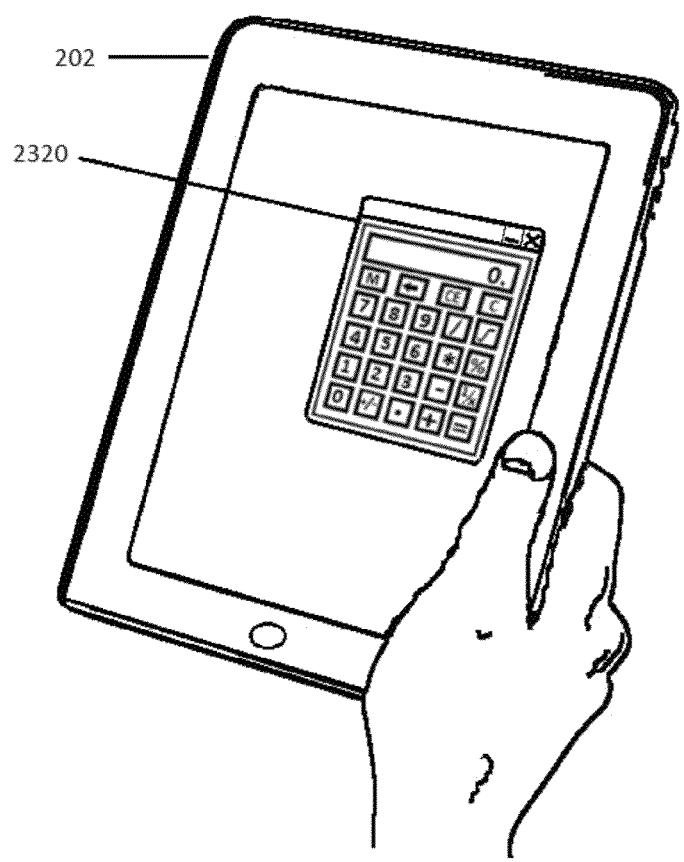
FIG. 23D illustrates the completion of a multi-touch defined window-first rectangular window on a multi-touch enabled device according to embodiments of the invention.

Node-Based Window Creation with Shape Definition Before Application—Specification and Operation There are various possibilities with regard to the application of the previously described node-based shapes and areas to the creation and editing of independent windows on a touch screen display. In one embodiment of node-based shape and area definition, a node-based shape is initiated as illustrated in FIG. 23A. In one embodiment finger 2302 and finger 2304 initially touch at point 2306 on the multi-touch input area of multi-touch device 202. The type, position and dimensions of the node-based shape are then completed as illustrated in FIG. 23B. In the case shown, a rectangle is created by finger 2308 and finger 2310 drawing apart from each other to define four corner nodes, of which node 2312 is the top-right node. Once the shape has been defined, a user interface in the form of a menu list is displayed to the user, as shown in FIG. 23C. The menu list 2316 appears adjacent to, or in front of the shape 2314 which was created. A user finger 2318 selects the specific application which is to be run in the window from the options in menu list 2316. Finally, as shown in FIG. 23D, the selected application is run in the newly created window 2320. Although the creation of a rectangular window is shown in FIG. 23A, FIG. 23B, FIG. 23C and FIG. 23D, it is anticipated that a window for the running of software applications can be created from any of the node-based shapes, including circles, ellipses, rectangles, triangles, quadrilaterals, pentagons, hexagons and greater-sided polygons.

Figure 24A:
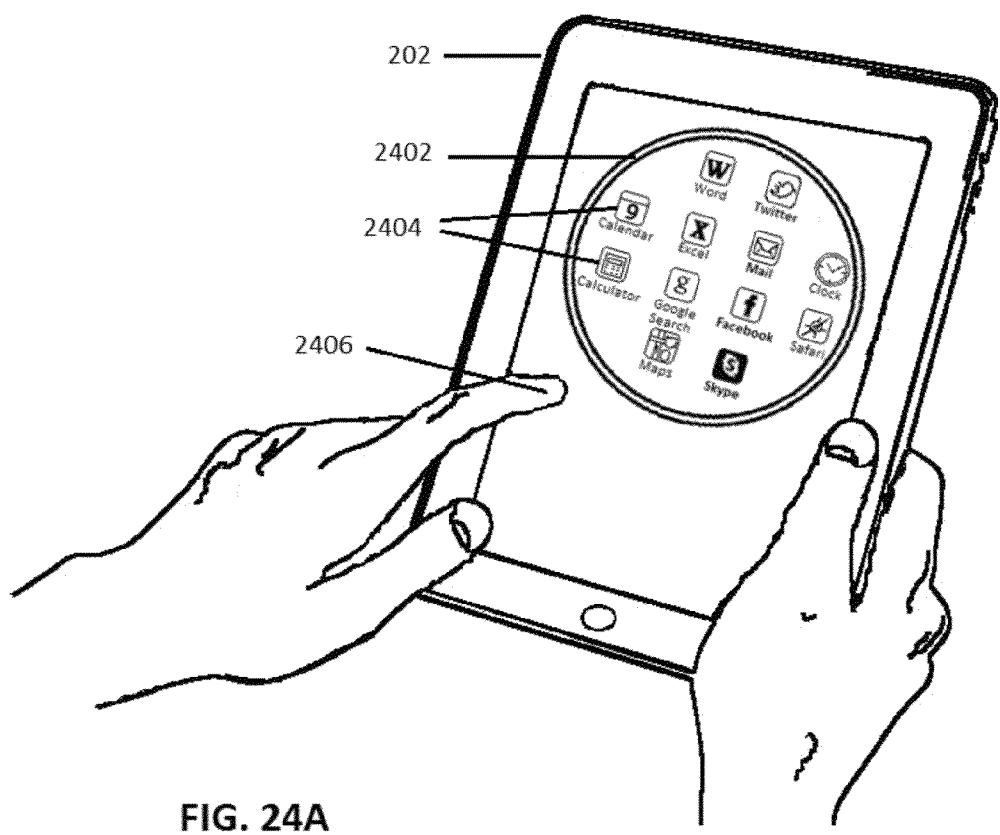
FIG. 24A illustrates an alternative selection of application step for a newly created window-first circular window according to an embodiment of the invention.
Figure 24B:
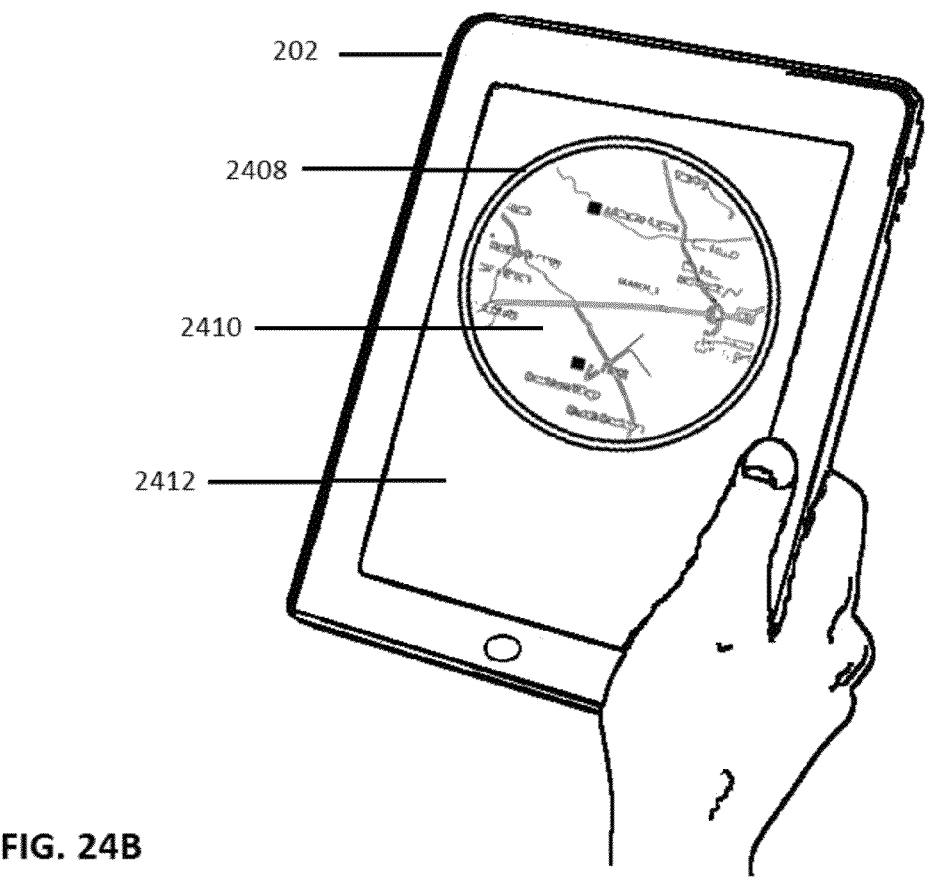
FIG. 24B illustrates the completion of the alternative multi-touch defined window-first circular window according to embodiments of the invention.

In another embodiment of node-based shapes being used to create windows, the node-based shape is first created and then the possible application options to run in the window appear inside the shape which will become the window, as shown in FIG. 24A (rather than the possible application options being presented on a list menu). The created shape 2402 is filled with application icons (two of which are labelled 2404) representing all the applications which can be run in the window. Once a user finger 2406 selects an application icon by touching it, that application will start within shape 2402 as shown in FIG. 24B. The new window 2408 is now running the selected application 2410, which is independent of any application running in another window or on the touch screen background 2412.

Node-Based Window Creation with Application Definition Before Shape—Specification and Operation A different approach to the application of node-based shapes and areas to the creation and editing of windows on a touch screen display is characterised by embodiments in which the application is selected first, and the shape, position and size of the window is defined afterwards.

Figure 25A:
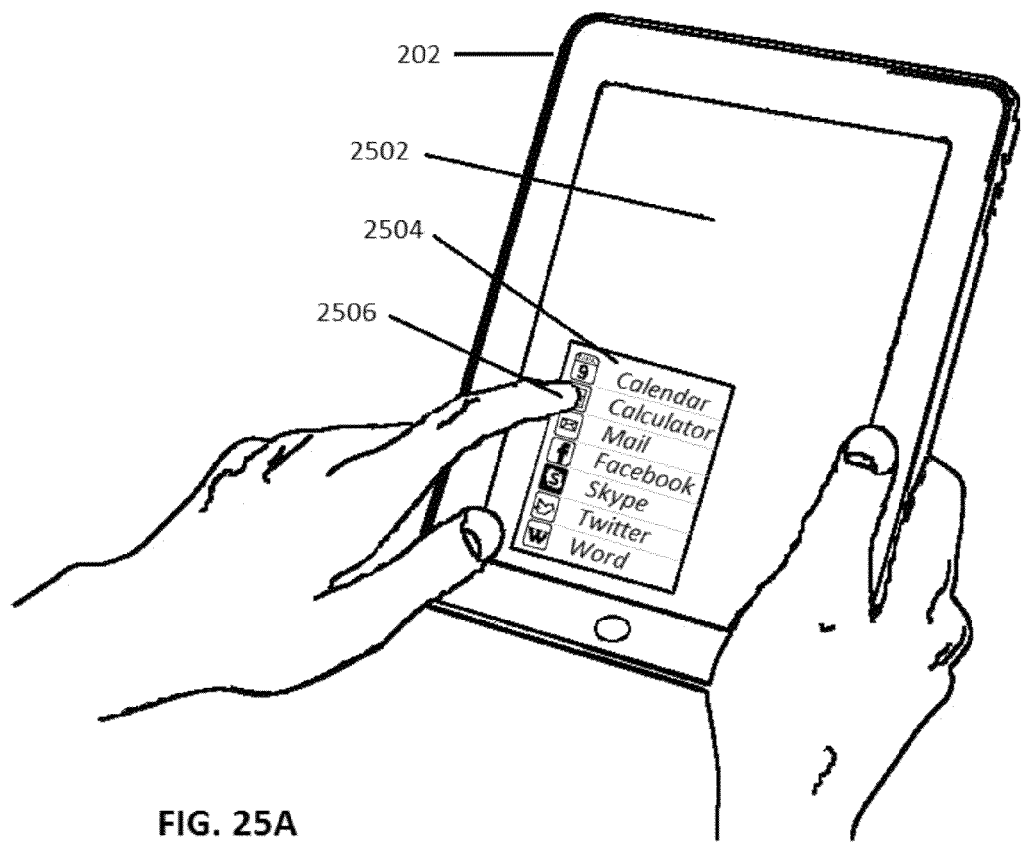
FIG. 25A illustrates the application selection stage for creating an application-first window according to prior art.
Figure 25B:
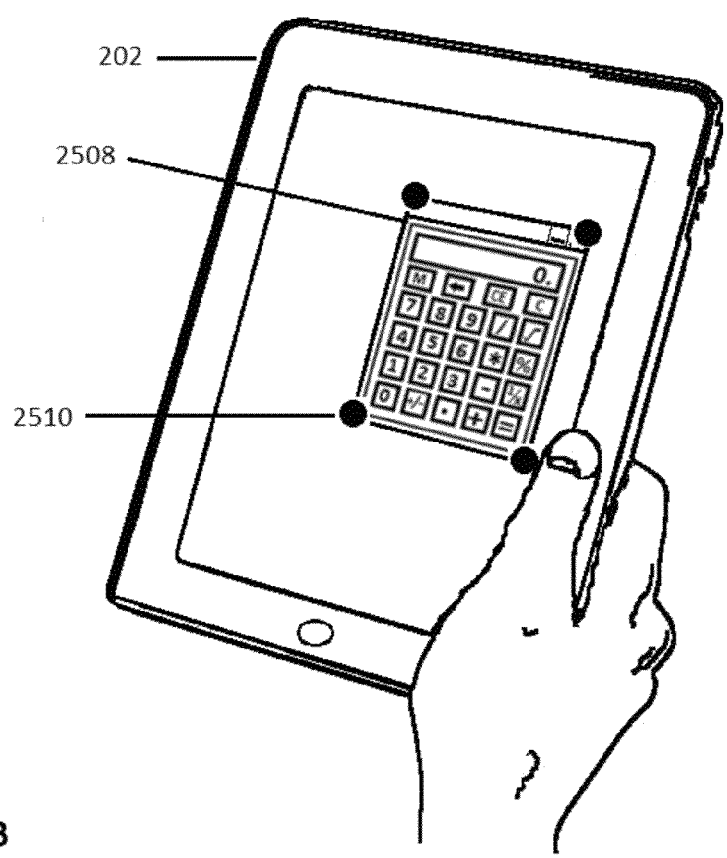
FIG. 25B illustrates the default window shape size and position appearance stage for creating an application-first window according to embodiments of the invention.
Figure 25C:
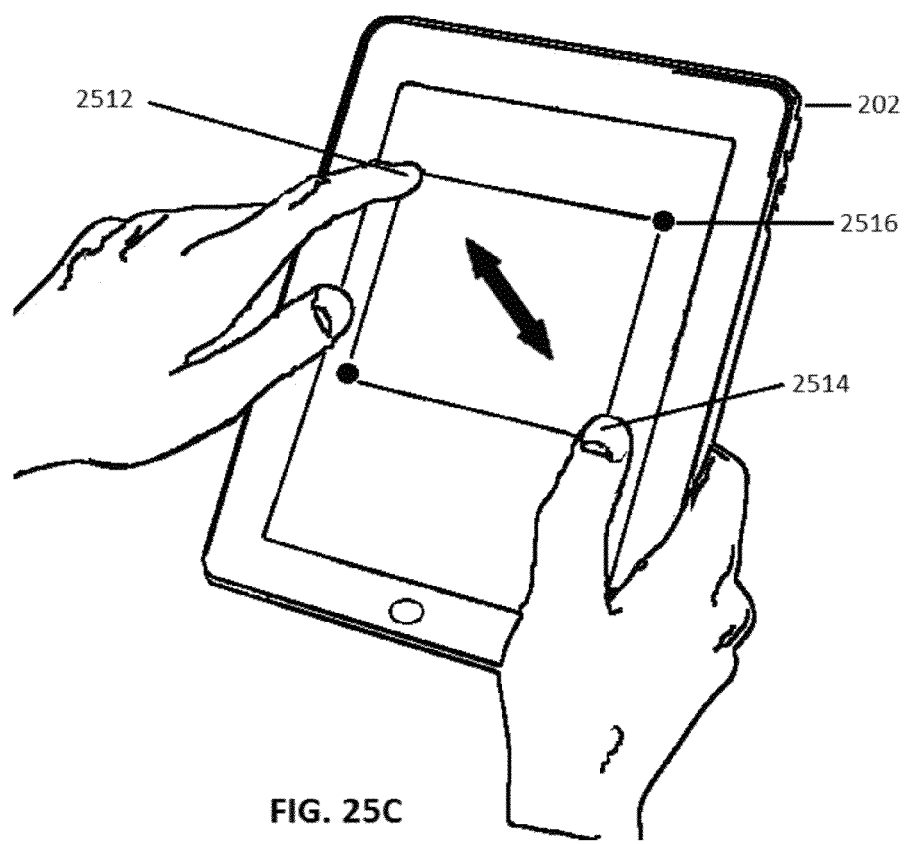
FIG. 25C illustrates the sizing and positioning stage for creating an application-first window according to embodiments of the invention.
Figure 25D:
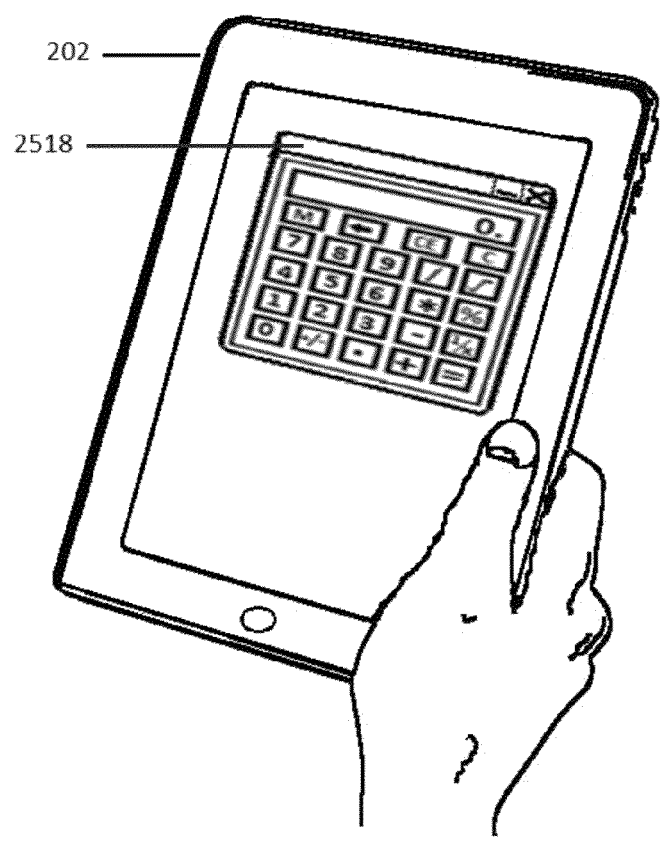
FIG. 25D illustrates the completion of a multi-touch defined application-first window according to embodiments of the invention.

In one embodiment the application is selected by the user as shown in FIG. 25A. In the embodiment shown in FIG. 25A the choice of application is determined from list menu 2504 appearing within the touch screen area 2502. User finger 2506 selects an application from list menu 2504. However it is anticipated that the means of application selection can be a different method, such as selection from a group of application icons. The chosen application will then appear in a window 2508 of preset or default position, shape and size on the touch screen for that application, as shown in FIG. 25B. In the embodiment illustrated in FIG. 25B, the calculator application defaults to a rectangular window in the shown position and size. However once the application window appears, each node of the window (one of which is indicated as node 2510) are shown to the user, and these nodes may be moved by user touches. FIG. 25C shows the top-left node 2512 and the bottom-right node 2514 of a rectangular window being moved apart by simultaneous user touches. In this case, since all four corner nodes of a rectangle are linked, the other nodes including the top-right node 2516 also move accordingly. In the illustration of FIG. 25C the movement of the corner nodes apart designates a stretching of the window, and changing of the nodes occurs until a timeout of approximately two seconds after the last node is touched. The resultant window 2518 is shown in FIG. 25D.

Node-Based Multi-Window Touch Screen Environment—Specification and Operation

Figure 26:
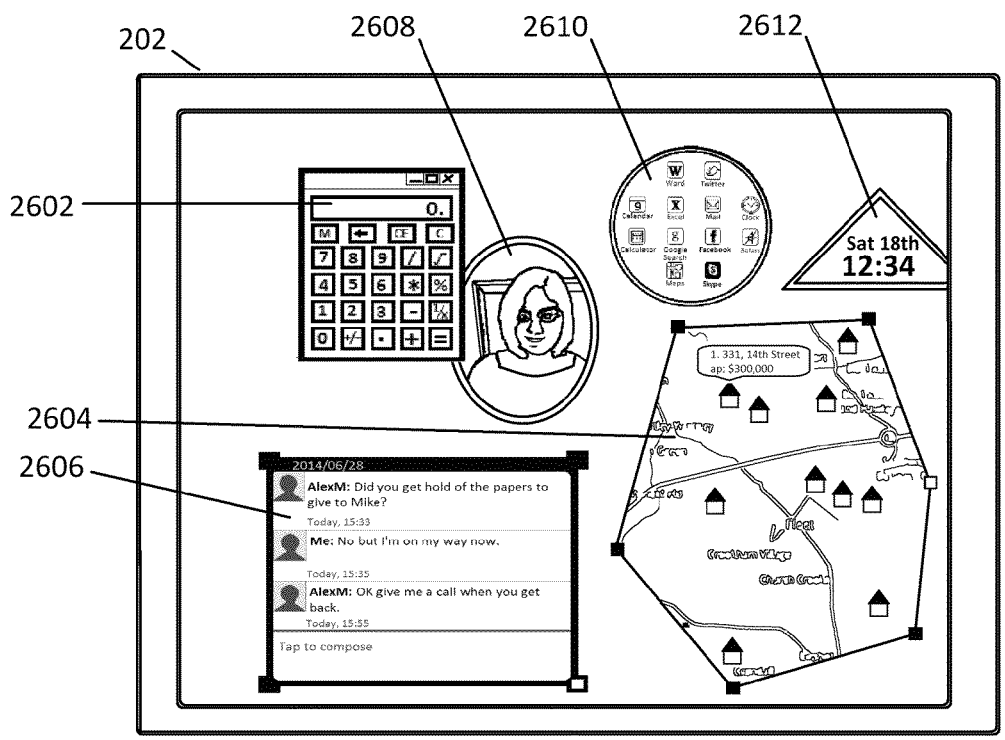
FIG. 26 illustrates a multi-touch device display containing many different windows, of various shapes running several different applications.

Practical embodiments for the creation of windows running software applications have been disclosed. However the environment in which the windows can run on a touch screen device is also disclosed. In one embodiment, multiple node-based windows can co-exist as shown in FIG. 26. The individual windows can be selected and moved, with a more recently created or selected window appearing in front of previously created or selected windows, as shown by more recently selected calculator application window 2602 appearing in front of previously created video conference application window 2608. Multiple window shapes containing multiple application types and instances can be visible at the same time, such as triangular clock application window 2612, real estate map application 2604 and internet messaging application window 2606. Windows containing groups of application icons for selection by the user as shown by window 2610 can also appear with other windows. Upon selection, any individual window can be stretched, moved, re-shaped or deleted. However even if not currently selected, a window can be active, and display data to the user, in a similar way to conventional computer windowing systems controlled by a mouse or similar device.

Figure 27:
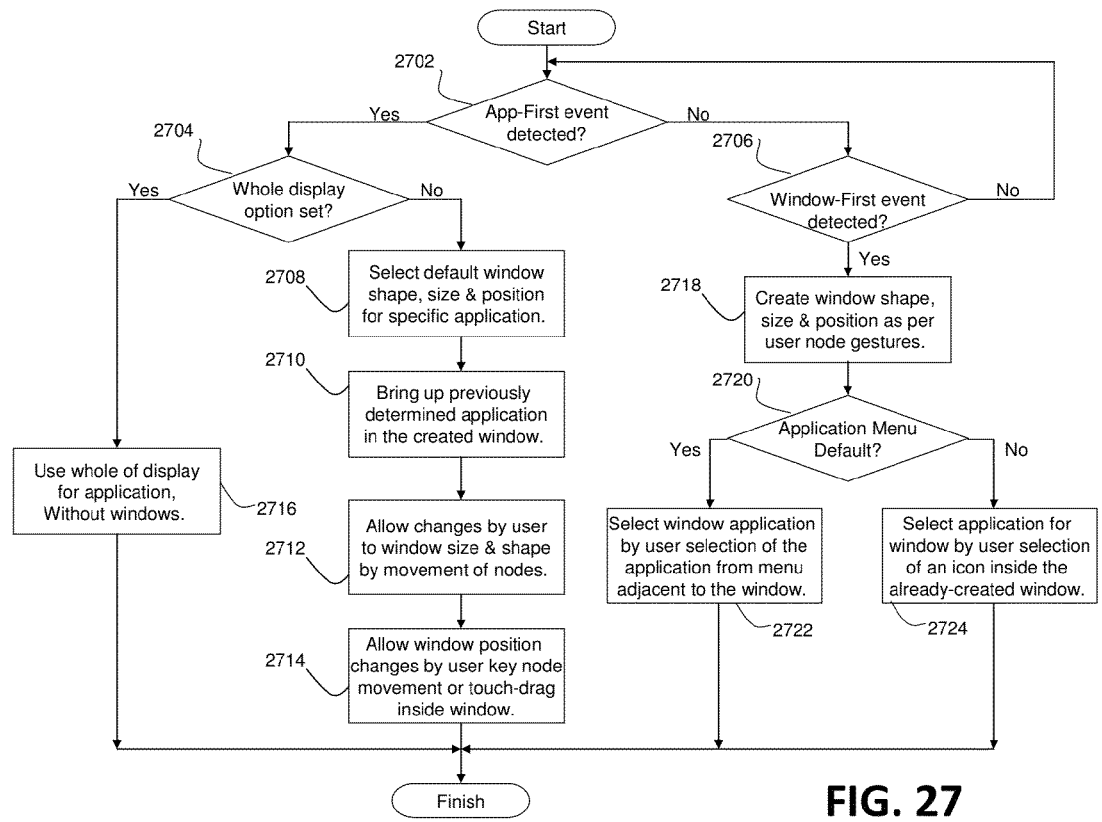
FIG. 27 shows a flow-chart defining how windows may be created and defined on a multi-touch device.

The method to create the windows applications possible within the window environment is depicted in FIG. 27. Decision block 2702 ascertains whether an application-first selection has been made (selection by the user of a desired application). In the case that it has been, decision block 2704 determines whether a default or option is set which only allows whole-screen applications. If this is the case, the selected application will run full-screen, such as typically occurs in current, prior art smartphone and tablet applications, and no windowing environment will be initiated. If the whole screen option has not been set, a default window process 2708 will be created of the default shape, size and position for the selected application. Application creation task 2710 populates the default window with the selected application, which is followed by customisation task 2712 which allows the user to modify window size and shape by the movement of nodes. Finally for this method, positioning task 2714 allows the new window to be moved by the user to the desired position.

Where decision block 2702 does not detect an application-first event, and decision block 2706 does not detect a windows-first event, the touch screen device will continue monitoring for either of these events. If decision block 2706 does detect a windows-first event, such as the detection of a node-based shape being drawn on the touch screen, window creation task 2718 will be initiated. The window creation task will create a shape according to the nodes and gestures defined by the user. Decision logic 2720 will then decide the method by which the user will define the application which will run in the new window, according to options and defaults. Either a list menu task 2722 or an icon selection task 2724 will be initiated to prompt the user to select an application for the window.

Apparatus Detailed Description and Operation

Figure 28:
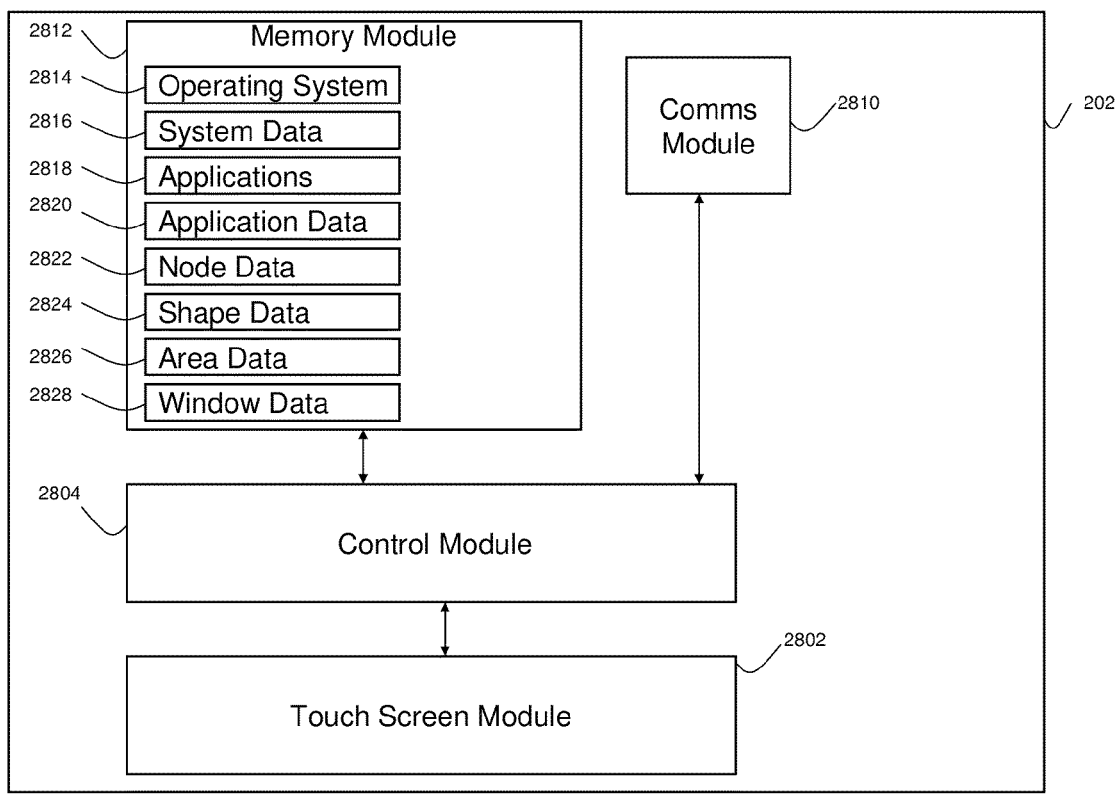
FIG. 28 is a modular view of a touch screen device capable of defining, editing and displaying node-based areas, shapes and windows according to embodiments of the invention.

In order to detect nodes, and to create shapes, areas and windows from those nodes, a touch screen module is required, as indicated by 2802 on FIG. 28. The output signals from the touch screen module in response to user touches are fed to a control module 2804 to interpret. The control module will determine whether a multi-touch event relating to nodes, node-based shapes, node-based areas or node-based windows has occurred. If so, the control module will process the information to create or modify the relevant entity. Node, shape, area or window data for storage will be routed to the memory module 2812, with the memory module also serving as the source of these data to the control module where required by the application 2818 or operating system 2814 running which requires the information. Where an application or operating system requires an interface with remote devices, networks, servers or databases, the communications module 2810 sends or receives the shape, area or windows node data, and supplementary information associated with that entity. This information is passed to or from the control module which may also route the data to or from the touch screen module or the memory module.

Figure 29:
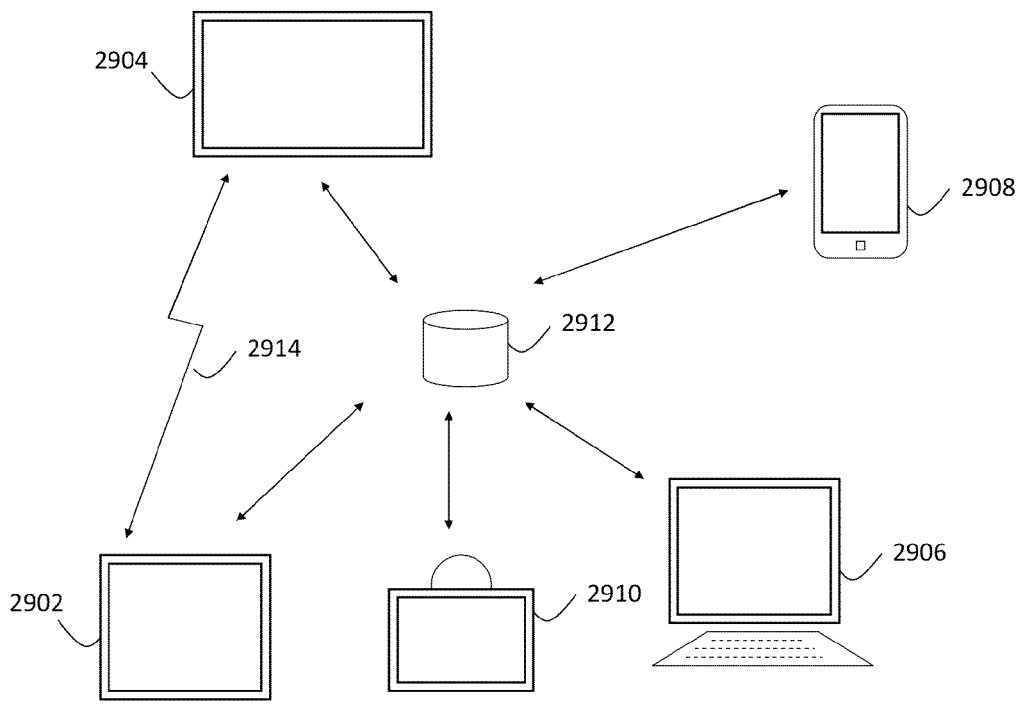
FIG. 29 demonstrates how a network of multi-touch enabled devices, touch screen devices, workstations, networks and databases can be used together to share node-based area, shape and window data between each other according to embodiments of the invention.

FIG. 29 shows how node-based shape, area and window information may be exchanged between different devices and computers via a network. However several networks combining different communications links and different servers and databases could be used, depending on the application.

A tablet computer 2902, a large touch screen device (such as a touch screen television) 2904, a personal computer or workstation 2906 (which does not have to have a touch screen or be multi-touch enabled), a smartphone 2908 and a satellite navigation system 2910 are shown communicating node-based shape, area and window information via a network. The information being provided by some or all of the devices is processed and stored at central servers or databases 2912. The central servers or databases will share information as requested and required by the devices' applications and operating systems, including node-based shape, area and window information, for example a circular area on a map. The link 2914 represents a one-to-one communication of node-based shape, area and window information between two users with suitable apparatus, and shows that a centralized information distribution system is not necessarily required. Peer-to-peer and small clusters of users can also share node-based shape, area and window information.

Advantages

Various applications of this new human interface to touch-device technology are foreseen.

Firstly, the node-based definition of various shapes in a drawing application would be an efficient and intuitive means of drawing these shapes. There are applications and user interfaces which will draw lines and (through this) shapes directly while following a user-controlled pointer. There are also applications coming from the mouse-type point and click tradition by which a shape type can be selected, and then drawn using a mechanism like a computer mouse. However there is not currently a means of drawing shapes directly from multi-touch gestures using the touched nodes to represent corners and other vital parts of those shapes.

Another real benefit of the node-based area definition is realised where a defined area on the touch screen or interacts with a map, space model or image, to establish real, geographic or coordinate-based areas. This would bring benefit to navigation systems for personal and vehicle navigation. It would also enhance mapping and geographic information systems including agriculture planning and real-estate management. In combination with application specific real estate data from central databases, searches and data could be provided about locations and areas specifically defined and customised by a client using a tablet computer or smartphone.

A third application for node-based multi-touch window definition is defining areas for a particular function on a touch screen itself. Of particular note is the quick and easy definition of a picture, or window within a screen, for example where most of a screen is being used for one application—such as web browsing, but there could be other user-drawn shapes, such as rectangles, which are showing another application independently—for example a TV display, a messaging screen, or a news-feed. Useable windows of different shapes are available for the first time, allowing operating systems and users to use windows other than rectangles for the first time. Also for the first time there is a way to create a window before defining the application which will run in it.

Apart from the use of node-based operations to create windows on a display, node-based multi-touch operations defined can be used to create and control a whole windowing environment on touch screen and other multi-touch enabled devices. Following creation, windows can be selected, moved, stretched and deleted under intuitive user direction and efficient operating system control.

As well as being simple to define shapes, areas and windows using user-touched nodes, the node-based method lends itself to the efficient communication of shape, area and window data. The sending of only a few key nodes over a communication channel which completely define a whole geometric entity, without sending a complete record of the shape, allows simple and low bandwidth communication of such data.

Although the description above contains several specificities, these should not be construed as limiting the scope of the embodiment, but as examples of several embodiments. For example the range of devices applicable is greater than tablet computers and smartphones, and finger operation referred to includes operation by a pointing device such as a stylus.

Thus the scope of the embodiments should be determined by the claims appended and their legal implications, rather than by the examples supplied.

I claim:

1. A method for interpreting multiple, concurrent user touches on a touch screen device to create and edit shapes on the display of said touch screen device, comprising:
    a. recognition of single and multiple, concurrent user touches to a touch screen device,
    b. interpretation of said user touches as node positions and associated node motions on the screen display of said touch screen,
    c. interpretation of said node positions, and said node motions to determine the geometric shape to be drawn on the touch screen display,
    d. retaining recognition and information of said shape persistently after the user touches to the touch screen device have ceased,
    e. allowing reselection by a user of a previously defined shape for operation on that geometric entity,
    f. allowing reselection by a user of any node of a previously defined shape for operation on that node.

2. The method of claim 1 wherein the number of said concurrent user touches is interpreted as two, and one of the nodes produced by these remains substantially motionless for a predetermined length of time while the other node initially moves and subsequently also remains substantially motionless for a predetermined length of time, thereby resulting in the drawing of a circle centered on the initially stationary node and passing through the initially moving node.

3. The method of claim 1 wherein the number of said concurrent user touches is interpreted as two, and both of the nodes produced by said concurrent user touches initially move and subsequently remain substantially motionless for a predetermined length of time, thereby resulting in the drawing of a rectangle determined by the positions of the two nodes at diagonally opposite corners.

4. The method of claim 3 wherein the two concurrent user touches are initially detected as a single node due to proximity of said user touches to each other before the movement of the two resultant nodes apart.

5. The method of claim 1 wherein the number of said concurrent user touches is interpreted as three and the nodes produced by these remain substantially motionless for a predetermined length of time, thereby resulting in the drawing of a triangle between the three nodes such that each node position becomes an apex of the triangle.

6. The method of claim 1 wherein the number of said concurrent user touches is interpreted as four and the nodes produced by these remain substantially motionless for a predetermined length of time, thereby resulting in the drawing of a quadrilateral shape between the four nodes such that each node position becomes a corner of the quadrilateral.

7. The method of claim 1 wherein the number of said concurrent user touches is interpreted as five and the nodes produced by these remain substantially motionless for a predetermined length of time, thereby resulting in the drawing of a pentagon between the five nodes such that each node position becomes a vertex of the pentagon.

8. The method of claim 1 wherein the number of said concurrent user touches is interpreted as greater than five and the nodes produced by these remain substantially motionless for a predetermined length of time, thereby resulting in the drawing of a polygon between the plurality of nodes such that each node position becomes a vertex of said polygon.

9. The method of claim 1 wherein reselection of the shape is via the user touching a node or side of the shape for a predetermined period of time.

10. The method of claim 1 wherein said operation on said geometric entity is movement of the whole geometric entity with all nodes being moved together with respect to the virtual area or background so that the nodes are not moved in relation to one another.

11. The method of claim 1 wherein said operation on said geometric entity is the addition of user-defined information into predetermined fields to categorise, label or otherwise define parameters relating to the geometric entity in the area of application.

12. The method of claim 1 wherein said operation on said geometric entity is the deletion of the geometric entity.

13. The method of claim 1 wherein said operation on said geometric entity is an independent moving of two component nodes of said geometric entity along two orthogonal axes of said touch screen module such that a two dimensional stretching or compressing of said geometric entity occurs proportional to the movement of the two nodes in each axis.

14. The method of claim 13 wherein said two dimensional stretching or compressing is of two nodes on the circumference of a circle geometric entity such that an ellipse shape is created from the original circle.

15. The method of claim 1 wherein one or more sub-nodes is automatically created at intervals along the sides of a shape, allowing the user to identify, select and move any said sub-node whereby said sub-node becomes a new node of said shape and a new side is added to said shape.

16. The method of claim 1 wherein the number of sides in a geometric shape is decreased by user selection of a node of said shape and a subsequent deletion operation on said selected node occurs, whereby nodes previously connected to the deleted node are directly joined.

17. The method of claim 1 wherein said geometric shape becomes the boundary within said touch screen module of an area comprising a two dimensional image, map or surface having its own coordinate system such that the bounding node positions of said areas on the display of said touch screen correspond to the coordinates of said image, map or surface.

18. The method of claim 1 wherein said geometric shape is created on top of an existing two dimensional image, map or surface having its own coordinate system such that the bounding node positions of said shape define coordinates of said two dimensional image, map or surface displayed on said touch screen module, and a subsequent pan and zoom operation is performed either to the specific area of said image, map or surface defined by said geometric shape or to an area centered on and including said specific area which also shows additional surrounding area due to differences in shape or aspect ratio of the said shape and the available screen area.

19. The method of claim 1 wherein said geometric shape becomes the boundary within said touch screen module of a new window which runs a software application independent from any main or background software application, and independent from a software application running in any other window.

20. The method of claim 19 wherein selection options for applications to run in said new window are presented to the user in a menu or list adjacent to the new window after creation of the new window.

21. The method of claim 19 wherein selection options for applications to run in said new window are presented to the user via icons appearing inside the new window after creation of the new window.

22. The method of claim 19 wherein an applications to run in said new window is selected by the user prior to creation of the new window.

23. An apparatus, comprising:
   a. a touch screen module incorporating a touch panel adapted to receiving user input in the form of multi-touch shape gestures including finger touches and finger movements, and a display surface adapted to present node and shape information to the user,
   b. a control module which is operatively connected to said touch screen module to determine node positions from said finger touches, to determine node motions from said finger movements, to recognize a geometric shape from combinations of said node positions and node motions, to recognize an application associated with said geometric shape, to detect a selection touch to a pre-existing said shape, to control the editing of said selected shape, to control other modules and to generate a continuous graphical image including said node positions and plurality of said geometric shapes for display on the touch screen module,
   c. a memory module logically connected to said control module which is able to store from and provide to said control module a logical element selected from the group consisting of operating systems, system data for said operating systems, applications which can be executed by the control module, data for said applications, node data shape data, area data and windows data.

24. The apparatus of claim 23, wherein the apparatus is selected from the group consisting of a mobile telephone with a touch screen, a tablet computer with a touch screen, a satellite navigation device with a touch screen, an electronic book reader with a touch screen, a television with a touch screen, a desktop computer with a touch screen, a notebook computer with a touch screen and a workstation computer of the type used in command and control operations centers such as air traffic control centers, but having a touch screen.

25. The apparatus of claim 23, wherein the node, shape, area and window information presented to the user includes node symbols, shapes, areas and windows currently detected or selected.

26. The apparatus of claim 23, wherein the node, shape, area and window information presented to the user includes node symbols, shapes, areas and windows from previous user touches, recalled from memory, previously defined, or received from a remote database, device or application.

27. The apparatus of claim 23, wherein a communications module is incorporated adapted to the transfer of node, shape, area and window information including node position and shape type, to and from other devices, networks and databases.

28. The apparatus of claim 27, wherein the control module will accept external node, shape, area and window data from said communications module and pass them to the touch screen module for display to the user.

29. The apparatus of claim 27, wherein the control module will pass locally created nodes, shapes, areas and windows to the communications module for communication to other devices, networks and databases.

30. The apparatus of claim 23, wherein said geometric shapes recognised by said control module from the detected node positions and node movements include circles, rectangles, triangles, quadrilaterals, pentagons and polygons with greater than five vertices.

31. The apparatus of claim 23, wherein the edits to selected shapes includes the transformation of a selected circle into an ellipse.

32. The apparatus of claim 23, wherein the edits to selected shapes includes the two dimensional stretching of a selected shape in the axes determined by node movements.

33. The apparatus of claim 23, wherein the edits to selected shapes, areas and windows includes the creation of shapes, areas and windows with one side more than when selected, by the addition of a new node between two existing nodes of a shape.

34. The apparatus of claim 23, wherein the node positions of a re-selected geometric shape, area or window are moved by the node being touched with a finger which is moved over the surface of said touch screen module wherein the node moves accordingly, and the said geometric shape, area or window is modified accordingly.

35. The apparatus of claim 23, wherein said geometric shapes are re-selected by a non-moving user touch of a constituent node of said geometric shape for a period of less than three seconds, after which the whole geometric shape is moved accordingly by subsequent movement of said constituent node.

36. The apparatus of claim 23, wherein the said geometric shapes recognised by said control module represent areas on a two dimensional image, map or surface having its own coordinate system wherein the bounding node positions of said areas on the display of said touch screen correspond to the coordinates of said image, map or surface.

37. The apparatus of claim 23, wherein the said geometric shapes recognised by said control module represent window boundaries on the display of said touch screen such that a plurality of independent computer programs or applications are run concurrently on said display.

38. The apparatus of claim 23, wherein said geometric shapes recognised by said control module represent area boundaries on the display of said touch screen such that a combined pan and zoom operation is performed to the specified said area boundary.

* * * * *